(12) United States Patent
Tamura et al.

(10) Patent No.: US 9,143,719 B2
(45) Date of Patent: Sep. 22, 2015

(54) STAND FOR FACILITATING AIR FLOW THROUGH AN ELECTRONIC DEVICE

(75) Inventors: Tomoaki Tamura, Tokyo (JP); Yasuyuki Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 469 days.

(21) Appl. No.: 13/551,494

(22) Filed: Jul. 17, 2012

(65) Prior Publication Data
US 2013/0107136 A1 May 2, 2013

(30) Foreign Application Priority Data
Oct. 28, 2011 (JP) ................................. 2011-238004

(51) Int. Cl.
*H04N 5/64* (2006.01)
*G06F 1/16* (2006.01)

(52) U.S. Cl.
CPC .............. *H04N 5/64* (2013.01); *G06F 1/1632* (2013.01)

(58) Field of Classification Search
CPC .............................. H04N 5/64; G06F 1/1632
USPC ............... 348/825, 836; 361/679.21, 679.26, 361/679.29, 679.41, 679.55; 248/917, 918; 345/905
See application file for complete search history.

(56) References Cited

U.S. PATENT DOCUMENTS

| | | | |
|---|---|---|---|
| 5,583,529 A * | 12/1996 | Satou | 345/87 |
| 6,266,243 B1 | 7/2001 | Tomioka | |
| 6,532,152 B1 * | 3/2003 | White et al. | 361/692 |
| 6,778,935 B2 | 8/2004 | Maeda et al. | |
| 7,255,317 B2 | 8/2007 | Huang et al. | |
| 7,521,848 B2 | 4/2009 | Kim et al. | |
| 2005/0280984 A1 | 12/2005 | Huang et al. | |
| 2006/0043253 A1 | 3/2006 | Huang et al. | |
| 2008/0138028 A1 * | 6/2008 | Grady et al. | 386/1 |
| 2008/0186410 A1 * | 8/2008 | Hardacker et al. | 348/734 |
| 2009/0086129 A1 * | 4/2009 | Nakamura et al. | 349/96 |
| 2010/0138581 A1 * | 6/2010 | Bird et al. | 710/303 |
| 2011/0216495 A1 * | 9/2011 | Marx | 361/679.22 |

FOREIGN PATENT DOCUMENTS

| | | |
|---|---|---|
| JP | 2000-216558 | 8/2000 |
| JP | 2002-171461 A | 6/2002 |
| JP | 2006-004396 | 1/2006 |
| JP | 2006-072958 | 3/2006 |
| JP | 2006-119595 A | 5/2006 |
| JP | 2008-165101 A | 7/2008 |
| WO | WO 2010/080500 A1 | 7/2010 |

OTHER PUBLICATIONS

Office Action dated Sep. 18, 2012 of corresponding Japanese Patent Application 2011-238004—3 pages.
Office Action dated Aug. 27, 2013 of corresponding Japanese Patent Application 2012-282869—6 pages.

* cited by examiner

*Primary Examiner* — Victor Kostak
(74) *Attorney, Agent, or Firm* — Knobbe Martens Olson & Bear LLP

(57) ABSTRACT

According to one embodiment, electronic equipment configured to support an external apparatus including a display screen and a housing comprising an opening disposed on a side opposite the display screen, the electronic equipment includes: a first supporter electrically connected to the external apparatus, a connector being exposed from the first connector, the connector detachably being connected to the external apparatus; and a second supporter configured to support an area of the housing from the side opposite the display screen, the area excluding a portion on which the opening is disposed.

10 Claims, 24 Drawing Sheets

STAND FOR FACILITATING AIR FLOW THROUGH AN ELECTRONIC DEVICE

CROSS-REFERENCE TO RELATED APPLICATIONS

This application is based upon and claims the benefit of priority from Japanese Patent Application No. 2011-238004, filed Oct. 28, 2011, the entire contents of which are incorporated herein by reference.

FIELD

Embodiments described herein relate generally to a stand and electronic equipment.

BACKGROUND

Conventionally known are stands that support the rear surfaces of housings of electronic apparatuses in a detachable manner.

Such stands are required to reliably hold the housings and not to hinder air flow through vents provided to the housings.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
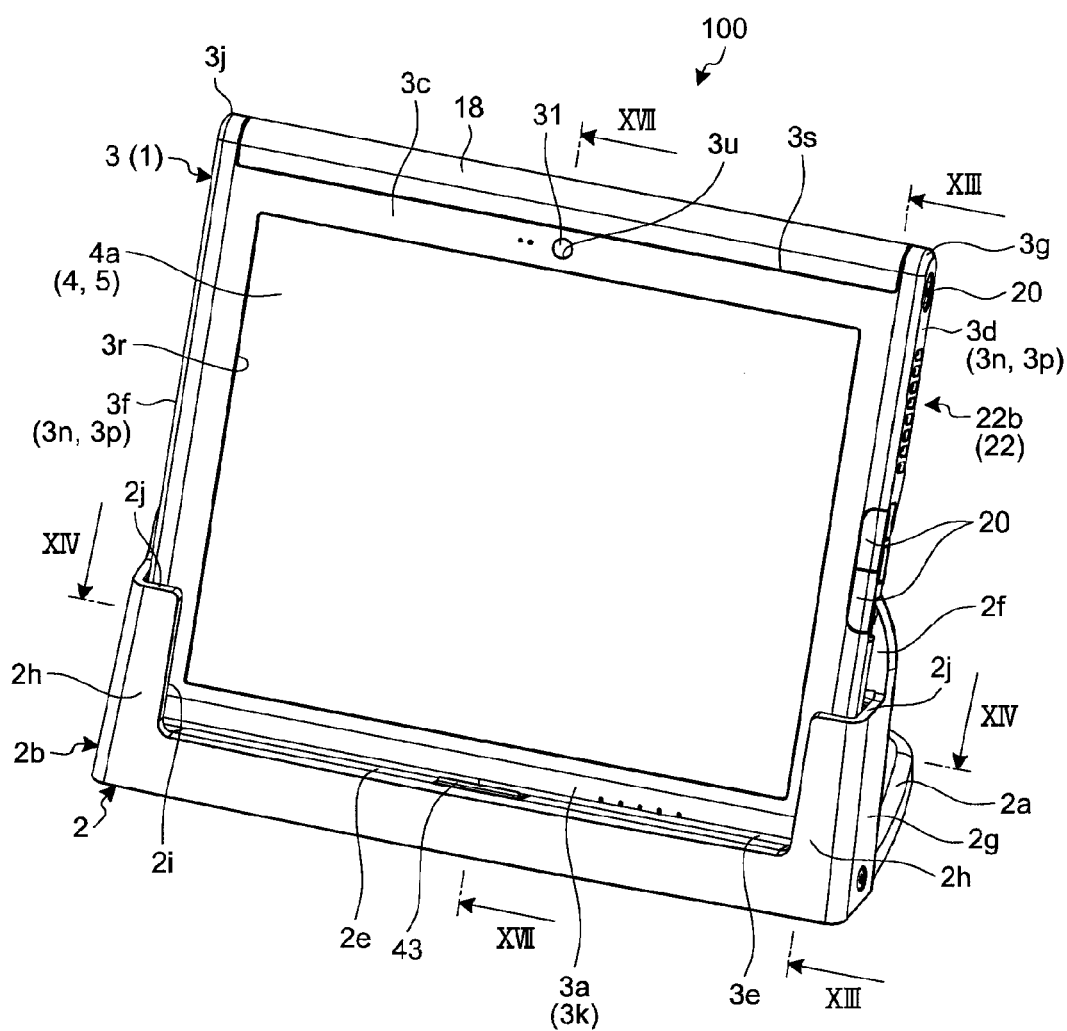
FIG. 1 is an exemplary perspective view illustrating a stand according to a first embodiment and a television receiver held by the stand.

In general, according to one embodiment, a stand configured to support an external electronic apparatus, the external electronic apparatus comprising: a display comprising a display screen; a circuit board located on a side opposite the display screen of the display; a housing configured to cover the side opposite the display screen of the display and to house the display and the circuit board, the housing comprising a wall comprising a vent; and a first connector a part of which is exposed from the housing, the stand comprises: a second connector detachably connected with the first connector; a placement surface portion on which the external electronic apparatus is placed when the first connector is electrically connected to the second connector; and a supporter configured to support at least a side of the housing of the external electronic apparatus located opposite the display screen in such a manner that a first edge of the housing is located close to the placement surface portion and a second edge of the housing is located away from the placement surface portion when the external electronic apparatus is placed on the placement surface portion, wherein the supporter is configured to extend from the placement surface portion to an intermediate position between the first edge and the second edge or to a position located on a side close to the second edge beyond the intermediate position, and the stand is configured to expose the vent of the wall from an edge of the stand located close to the second edge at the side close to the second edge when the external electronic apparatus is placed on the placement surface portion.

The following exemplary embodiment and modified examples comprise identical elements. The same elements are labeled with the same reference numerals and the duplicated descriptions are omitted. Some drawings are illustrated with directions (an X direction, a Y direction, and a Z direction) for the sake of convenience. The X direction is the width direction of a display screen of a television receiver when viewed from the front of the television receiver. The Y direction is the height direction of the display screen when viewed from the front. The Z direction is the front-back direction (the length direction or the thickness direction of a housing) when viewed from the front. The X, Y, and Z directions are orthogonal to each other.

In the following embodiment, a television receiver is exemplified as an electronic apparatus. The electronic apparatus according to the embodiment, however, is not limited to television receivers. Examples of the electronic apparatus according to the embodiment include various types of electronic apparatuses, such as tablet, slate, notebook, and desktop personal computers, smartphones, smarttelevisions, smartbooks, cellular phones, personal digital assistants (PDAs), image display devices, and videophone devices.

First Embodiment

In a first embodiment, as exemplarily illustrated in FIG. 1, a television receiver system 100 (electronic apparatus system) comprises a television receiver 1 as an example of the electronic apparatus and a stand 2 as an example of a supporter, to which the television receiver 1 is attached. In the first embodiment, when the stand 2 (supporter) is connected to the television receiver 1 (electronic apparatus), for example by adding connectors that are electrically connected to circuits in the television receiver 1 and by increasing the number of such connectors, the stand 2 can add functions that the television receiver 1 does not have and expand or extend existing functions of the television receiver 1. In other words, the stand 2 (supporter) is an example of a function expander for the television receiver 1 (electronic apparatus).

The stand 2 supports a housing 3 of the television receiver 1 for housing a display 4. That is, the stand 2 is an example of a supporting device (a supporting base, a docking station, or electronic equipment) of the television receiver 1. The stand 2 can comprise a mechanism (not illustrated in FIG. 1) capable of adjusting the angle of a display screen 4a of the display 4. In such a case, the stand 2 is an example of an angle adjustor of the display screen 4a (the housing 3 housing the display 4).

Television Receiver (Electronic Apparatus)

Figure 2:
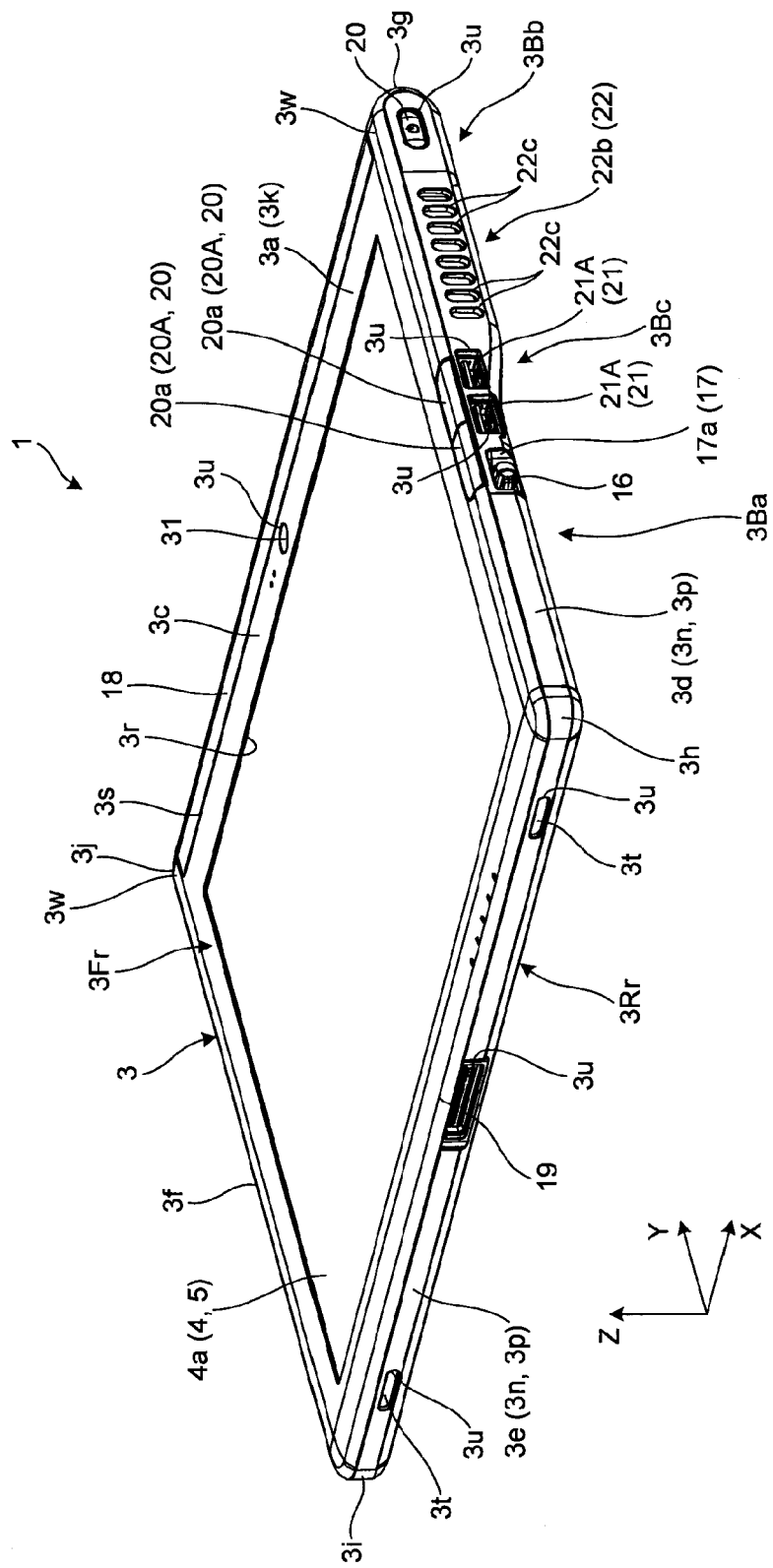
FIG. 2 is an exemplary perspective view illustrating the television receiver in the embodiment.
Figure 3:
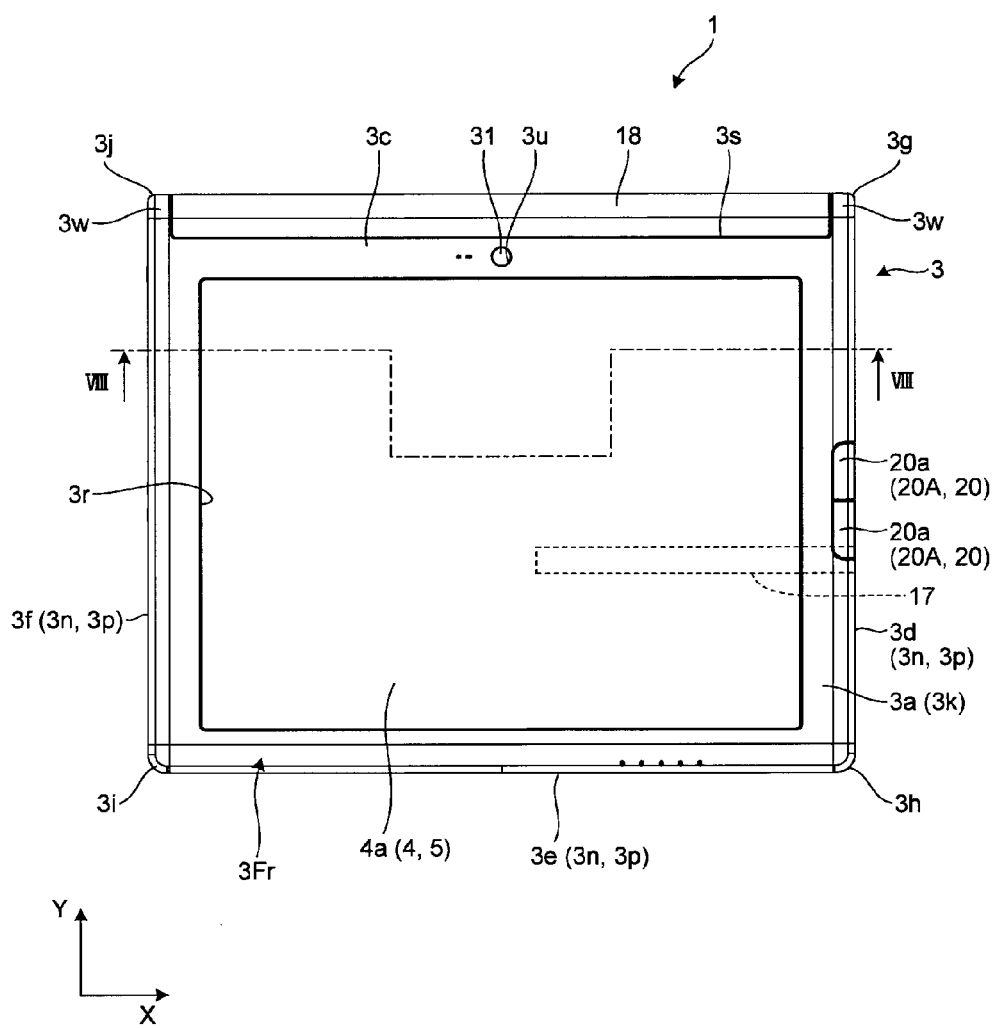
FIG. 3 is an exemplary front view illustrating the television receiver in the embodiment.
Figure 4:
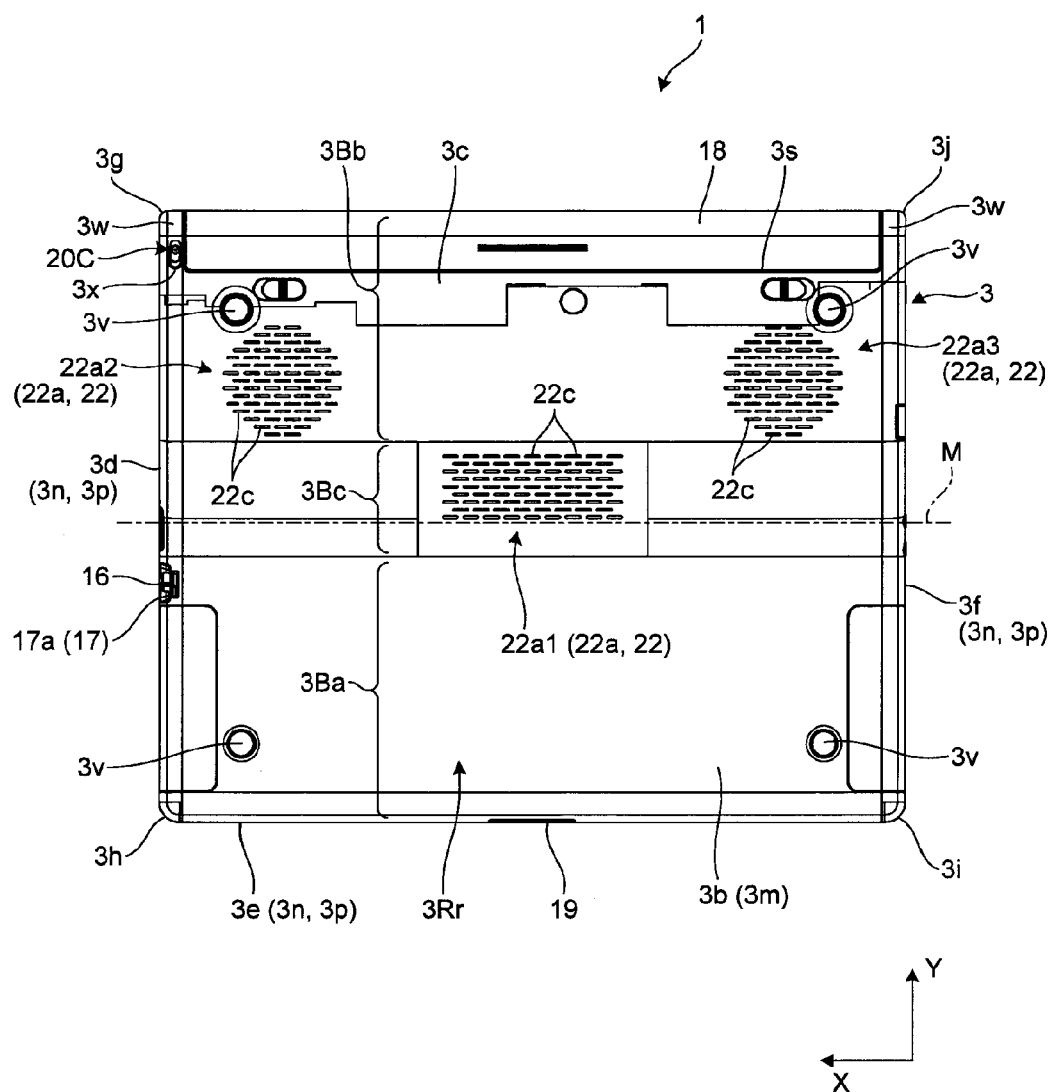
FIG. 4 is an exemplary rear view illustrating the television receiver in the embodiment.

In the embodiment, as exemplarily illustrated in FIGS. 1 to 4, the housing 3 of the television receiver 1 has a rectangular shape (in the embodiment, for example, an oblong shape) when viewed from the front and rear. In the embodiment, as exemplarily illustrated in FIGS. 2 and 5, the housing 3 is structured in a thin and flat rectangular parallelepiped shape in the front-back direction. The housing 3 has a front surface 3a (a front, a surface, a first surface, or a first surface portion) and a back surface 3b (a rear, a surface, a second surface, or a second surface portion) opposite the front surface 3a. The front surface 3a and the back surface 3b are nearly parallel to each other. As illustrated in FIGS. 3 and 4, the housing 3 has four edges 3c to 3f (sides or frames) and four corners 3g to 3j (shape edges, bent portions, or edges) when viewed from the front. The edges 3c and 3e are examples of a long side. The edges 3d and 3f are the examples of a short side.

The housing 3 has a wall 3k (a first wall, a first portion, a plate, a frame, a front wall, a frontward wall, or a ceiling wall) including the front surface 3a and a wall 3m (a second wall, a second portion, a plate, a back wall, a backward wall, or a bottom wall) including the back surface 3b. The walls 3k and 3m have rectangular shapes (in the embodiment, for example, oblong shapes). The housing 3 has four walls 3n (third walls, third portions, plates, side walls, edge walls, upright walls, or extending portions) including a side surface 3p (a surface, a surrounding surface, or a third surface) that extends between the walls 3k and 3m. The wall 3k is provided with an opening 3r having a rectangular shape, for example.

Figure 6:
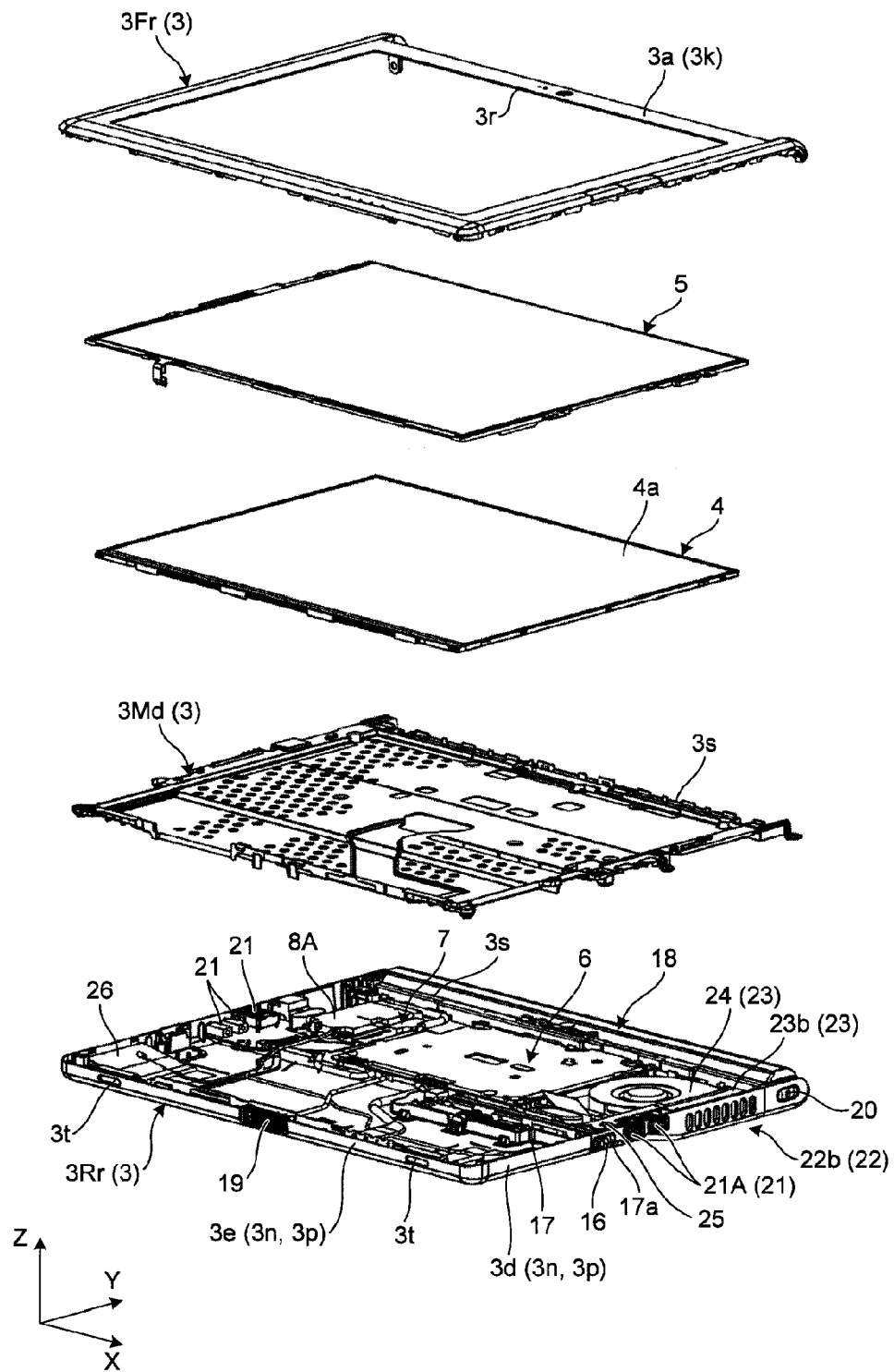
FIG. 6 is an exemplary exploded perspective view illustrating the television receiver in the embodiment.
Figure 8:
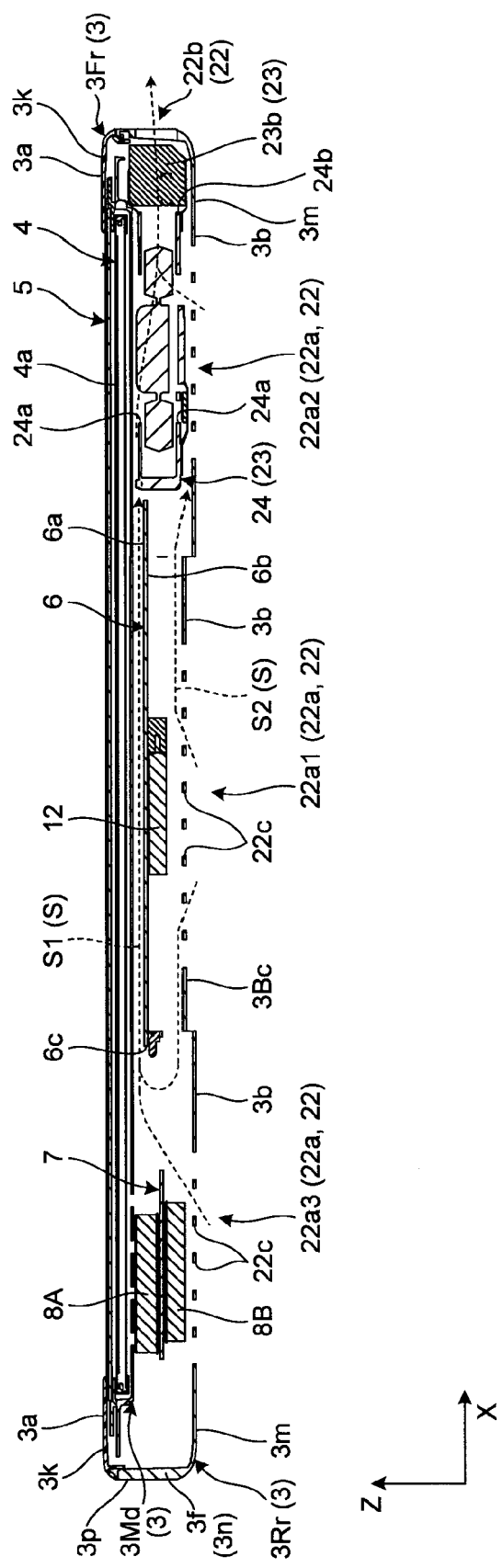
FIG. 8 is an exemplary sectional view taken along line VIII-VIII of FIG. 3.

The housing 3 can be structured by combining a plurality of parts (split bodies). For example, in the embodiment, the housing 3 has a first member 3Fr (a first portion, a front side member, or a cover) including at least the wall 3k and a second member 3Rr (a second portion, a back side member, a base, or a bottom) including at least the wall 3m. The walls 3n are included at least in either the first member 3Fr or the second member 3Rr (for example, the walls 3n are included in the second member 3Rr). As illustrated in FIGS. 6 and 8, in the embodiment, the housing 3 has a third member 3Md (a third portion, an intermediate member, a separating member, a barrier member, a wall member, an intercalated member, an inner plate, a middle plate, or a middle frame) located between the first member 3Fr and the second member 3Rr besides the first member 3Fr and the second member 3Rr. Apart of the walls 3n can be included in the third member 3Md. The housing 3 can be made of a metal material, a synthetic resin material, or the like. For example, the second member 3Rr and the third member 3Md can be made of materials having relatively high stiffness (for example, a metal material such as a magnesium alloy) while the first member 3Fr can be made by a material having relatively low stiffness (a material having lower stiffness than those of the second member 3Rr and the third member 3Md, for example, a synthetic resin material). The first member 3Fr, the second member 3Rr, and the third member 3Md can be provided with walls (protrusions or protruded walls) such as ribs. The walls readily enhance the stiffness of the housing 3. The third member 3Md can be provided with openings such as through holes. The openings can further reduce the weight of the housing 3.

Figure 5:
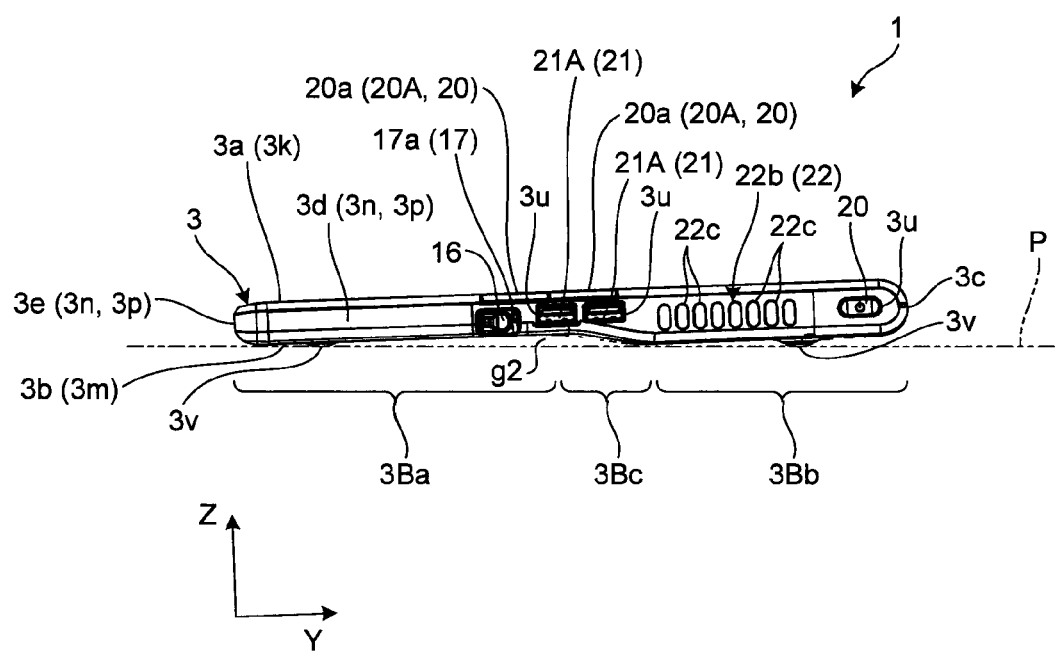
FIG. 5 is an exemplary side view illustrating the television receiver in the embodiment.

In the embodiment, as exemplarily illustrated in FIG. 5, the thickness of a first portion 3Ba, which is a lower side or a near side (a side close to the user) when the television receiver 1 is used by placing the longer side laterally, is thinner than that of a second portion 3Bb, which is then an upper side or a far side (a side away from the user) when the television receiver 1 is used as described above. Because of the difference in thickness, when the television receiver 1 is used while placed on a placement surface P such as the top surface of a desk, the heights of the front surface 3a and the display screen 4a of the housing 3 with respect to the placement surface P (horizontal plane) increase while extending from the near side (lower side) to the far side (upper side). As a result, a user who is for example located on the left side of the television receiver 1 in FIG. 5 views the display screen 4a in a so-called tilted state. In this way, the embodiment has an advantage that the display screen 4a provides good visibility to the user. An obtuse angle of the display screen 4a with respect to the placement surface P can be set equal to or larger than 135 degrees and less than 180 degrees in the state as illustrated in FIG. 5. In the embodiment, a plurality of protrusions 3v are provided to the back surface 3b of the housing 3, for example. As apparent from FIG. 5, the distance between the tip of the protrusion 3v disposed in the second portion 3Bb located on the right side in FIG. 5 and the display screen 4a is longer than the distance between the tip of the protrusion 3v disposed in the first portion 3Ba located on the left side in FIG. 5 and the display screen 4a. In the embodiment, the protrusion 3v (the tip thereof) disposed on the left side in FIG. 5 is an example of a first contacting portion while the protrusion 3v (the tip thereof) disposed on the right side in FIG. 5 is an example of a second contacting portion.

The housing 3 is provided with a part storage 17 into or from which a part 16 can be taken in or taken out. An opening 17a of the part storage 17, in the embodiment for example, is provided to the edge 3d. The opening 17a is provided to the edge 3d, which is located on the upper side in either a first posture or a second posture when the television receiver 1 is used, and is not located on the lower side when the television receiver 1 is not used. In the above-described example, the edge 3c is located on the upper side in the first posture while the edge 3d is located on the upper side in the second posture. This structure causes the opening 17a to be located on the upper side in the posture in use. As a result, this structure readily suppresses the part 16 from coming off from the part storage 17 through the effect of gravity. Examples of the part 16 include a stylus, a stylus pen, a pen, and a touching tool.

In the embodiment, as exemplarily illustrated in FIG. 3, a battery 18 and the display 4 are arranged in parallel with a direction orthogonal to the thickness direction of the housing 3 (the direction along the front surface 3a or the back surface 3b, the X direction, or the Y direction) so as not to overlap with each other in the thickness direction. In the embodiment for example, the battery 18 and the display 4 are arranged in the Y direction. As a result, the housing 3 can be structured so as to be thinner than when the battery 18 and the display 4 overlap in the thickness direction of the housing 3, for example. As another example, this arrangement readily further increases the thickness of the battery 18 than when the battery 18 and the display 4 overlap in the thickness direction of the housing 3. As a result, the capacity per unit volume of the battery 18 is readily increased. In the embodiment, as illustrated in FIG. 5, the housing 3 has the first portion 3Ba, which is relatively thin (also referred to as a thin portion), and the second portion 3Bb, which is relatively thick (also referred to as a thick portion). A battery storage 3s (battery supporter) that houses the battery 18 is disposed on the edge 3c of the second portion 3Bb, which is the thick portion. This structure readily further increases the thickness of the battery 18 than when the battery storage 3s is disposed in the first portion 3Ba, for example. As a result, the capacity per unit volume of the battery 18 is readily increased.

In the embodiment, the edge 3e, which is located opposite the edge 3c on which the battery storage 3s is disposed, is supported by the stand 2, for example. As a result, an operator (or a user) can attach the battery 18 to and remove the battery 18 from the housing 3 while the television receiver 1 is supported by the stand 2, for example. As illustrated in FIG. 2, a connector 19, which is connected to a connector 43 of the stand 2 (refer to FIGS. 11 and 15), is disposed on the edge 3e. As a result, the battery storage 3s and the connector 19 are readily disposed on the housing 3 without interfering with each other, for example. In addition, speaker covers 3t are disposed on the edge 3e so as to be exposed. The connector 19 and the speaker covers 3t are exposed through openings 3u provided to the wall 3n of the edge 3e. The connector 19 is an example of the first connector.

In the embodiment, as exemplarily illustrated in FIGS. 2, 3, and 5, an operation module 20 and a connector 21 are disposed on the front surface 3a and the side surface 3p. The operation module 20 may be a push-button, a push-switch, a slide switch, or a pointing device, for example. The connector 21 may be a power source cable connector, a universal serial bus (USB) connector, or a connector for earbuds or a microphone, for example. The operation module 20 is exposed through the opening 3u provided to the wall 3k of the housing 3 while the connector 21 is exposed through the opening 3u provided to the wall 3n of the housing 3. In addition, a camera 31 (a camera module or an imaging device) can be disposed on the front surface 3a.

In the embodiment, as exemplarily illustrated in FIGS. 2, 4, and 8, vents 22, through which air is taken in for cooling electronic parts 12 (for example, refer to FIG. 8) or exhausted, are provided to the back surface 3b and the side surface 3p of the housing 3. In the embodiment, intake vents 22a taking in air are provided to the back surface 3b (the wall 3m) while an exhaust vent 22b exhausting air is provided to the side surface 3p (the wall 3n or the edge 3d), for example. In the embodiment, the intake vents 22a and the exhaust vent 22b include a plurality of small holes 22c provided to the walls 3m and 3n respectively. In addition, the protrusions 3v are disposed on the back surface 3b. As a result, the intake vents 22a are not blocked even when the television receiver 1 is placed with the back surface 3b on the placement surface P as illustrated in FIG. 5. In the embodiment, the housing 3 has a slanted portion 3Bc, at the location where the thinner, first portion 3Ba of the housing 3 borders with the thicker, second portion 3Bb. As illustrated in FIG. 4, an intake vent 22a1 of the intake vents 22a is disposed on the back surface 3b of the slanted portion 3Bc. As illustrated in FIG. 5, the distance between the slanted portion 3Bc and the placement surface P is larger than the distances between the other portions and the placement surface P. As a result, the intake vent 22a1 provided to the slanted portion 3Bc readily reduces the air flow resistance and further enhances cooling efficiency. In addition, in the embodiment, the intake vents 22a are provided in plurality. For example, when one of the intake vents 22a is blocked due to any cause, the air flow into the housing 3 can be maintained through the other intake vents 22a. As a result, the cooling performance is hardly lost. The inside of the housing 3 may be cooled by a cooling mechanism 23 (refer to FIGS. 7 and 8) or by a natural cooling (convection cooling).

In the embodiment, as exemplarily illustrated in FIGS. 6 and 8, the display 4 (a display module, a display device, or a panel) is housed between the first member 3Fr and the third member 3Md. The display screen 4a, which is located on a side close to the front surface 3a of the display 4, is exposed through the opening 3r in a forward (outward) direction from the housing 3. A user can view the display screen 4 through the opening 3r from the front. The display 4 has a rectangular shape (in the embodiment, for example, an oblong shape) when viewed from the front. The display 4 is formed in a thin and flat rectangular parallelepiped shape in the front-back direction. The display 4 may be a liquid crystal display (LCD) or an organic electroluminescent display (OLED), for example.

In the embodiment, an input operation panel 5 (e.g., a touch panel, a touch sensor, or an operation surface), which is transparent, relatively thin and has a rectangular shape, is disposed on a front side (a frontward side or a side close to the wall 3k), for example. The input operation panel 5 covers the display screen 4a. An operator (or a user) can perform input processing by operation such as touching, pressing, and rubbing the input operation panel 5 with the fingers or the part 16 (stylus), or moving the fingers or the stylus near the input operation panel 5, for example. Light emitted from the display screen 4a of the display 4 passes through the input operation panel 5 and travels in the forward (outward) direction from the housing 3 through the opening 3r provided to the wall 3k. The input operation panel 5 is an example of an input module.

In the embodiment, as exemplarily illustrated in FIG. 6, boards 6, 7, and 25 are disposed on a back side of the display 4 (a backward side, a behind side, on a side close to the wall 3m, or a side opposite the display screen 4a) inside the housing 3. For example, in the embodiment, the boards are housed between the second member 3Rr and the third member 3Md. The boards 6, 7, and 25 are arranged at different positions in parallel with the display 4. The boards 6, 7, and 25 are arranged apart from the walls 3k, 3m, and 3n, for example, so as to provide spaces between themselves and the walls 3k, 3m, and 3n. The boards 6, 7, and 25 can be arranged in parallel with the display 4 so as not to overlap with each other in the thickness direction of the housing 3. The boards 6, 7, and 25 are fixed on the housing 3 with fixtures such as screws or protrusions (not illustrated).

In the embodiment, on the board 6 (a first board, a first circuit board, a control board, or a main board), one or more of the electronic parts 12 (refer to FIG. 8, only some of the electronic parts 12 are illustrated in FIG. 8) can be mounted. Examples of the electronic parts 12 include a central processing unit (CPU), a graphic controller, a power source circuit part, a platform controller hub (PCH), a memory slot connector, a LCD connector, an input/output (I/O) connector, a power source coil, an element, and a connector. A heating element is included in the examples of the electronic parts 12. The cooling mechanism 23 can be provided for cooling the electronic parts 12 (heating elements) generating a large amount of heat. The cooling mechanism 23 comprises a heat sink (a heat receiving module, not illustrated), a heat pipe 23a, a heat dissipation module 23b and a fan 24. The board 6 and the electronic parts 12 form at least a part of a control circuit (not illustrated). The control circuit can comprise a video signal processing circuit, a tuner, a high-definition multimedia interface (HMDI) signal processor, an audio video (AV) input terminal, a remote controller signal receiver, a controller, a selector, an on-screen display interface, a storage such as a read only memory (ROM), a random access memory (RAM), a hard disk drive, or a solid state drive (SSD), and a voice signal processing circuit. The control circuit controls output of images (moving images and still images) on the display screen 4a of the display 4, output of sound from speakers (not illustrated), and light emission of light emitting diodes (LEDs) (not illustrated). The display 4, the speakers, and the LEDs are the examples of an output module.

In the embodiment, as exemplarily illustrated in FIGS. 3, 4, 7, and 8, the boards 6 and 7, and the cooling mechanism 23 are arranged in the second portion 3Bb, which is the thick portion of the housing 3. This structure readily provides a wider space than when the boards 6 and 7, and the cooling mechanism 23 are arranged in the first portion 3Ba, which is the thin portion. As a result, a further cooling effect is readily obtained by an air flow produced by the fan 24 of the cooling mechanism 23. In the embodiment, two air intake vents 24a are provided so as to interpose the fan 24. One is provided above the fan 24 so as to face and overlap with an intake vent 22a2 (an air suction vent, a suction vent, or a vent) provided to the wall 3m while the other is provided on the opposite side with respect to the fan 24 (on a side close to display 4). In addition, an air exhaust vent 24b is provided so as to face the heat dissipation module 23b of the cooling mechanism 23. The fan 24 operates (rotates) so as to produce a flow of air taken in into the fan 24 through the air intake vent 24a and exhausted outside the fan 24 through the air exhaust vent 24b. The air flow exhausted outside the fan 24 from the air exhaust vent 24b is supplied to the heat dissipation module 23b. The fan 24 and the heat dissipation module 23b are disposed in the corner 3g at which the edges 3c and 3d, which are located on the upper side in a specified (controlled) use state, are joined. As a result, the fan 24 and the heat dissipation module 23b can be arranged on the upper side in the inside of the housing 3 regardless of the posture of the television receiver 1 in use, for example. This arrangement causes heat to hardly remain inside the housing 3, for example. The fan 24 and the heat dissipation module 23b are disposed adjacent to the exhaust vent 22b.

In the embodiment, the board 7 is disposed at a position so as to interpose the board 6 between the board 7 and the cooling mechanism 23, for example (the board 7, the board 6, and the cooling mechanism 23 are arranged in this order in the second portion 3Bb, for example). This arrangement allows air taken from the outside to be supplied to the board 7 prior to reaching the position of the board 6. As a result, heat dissipation efficiency of the board 7 is readily enhanced, for example. The board 7, on which modules 8A and 8B are mounted, is located opposite other heavy object, i.e., the cooling mechanism 23 with respect to the board 6, which is located in the center of the housing 3 and has a relatively heavy weight among the elements of the housing 3. As a result, the weight balance of the television receiver 1 is improved. This improved balance allows a user to easily carry the television receiver 1, for example.

In the embodiment, as exemplarily illustrated in FIGS. 4 and 8, the intake vent 22a2 located close to the fan 24, an intake vent 22a3 located opposite the intake vent 22a2 with respect to the board 6, and the intake vent 22a1 located closer to the electronic parts 12 that are heating elements than the intake vents 22a2 and 22a3, are provided to the wall 3m of the housing 3. The intake vent 22a2 enables air to flow more efficiently inside the housing 3. An air flow S flowing through the intake vent 22a3 branches into an air flow S2 and an air flow S1. The air flow S2 flows toward the fan 24 along a second surface 6b on the rear side of the board 6. The air flow S1 flows through (around or detours) the outside of an edge 6c located on the opposite side of the board 6 with respect to the fan 24, and flows toward the fan 24 along a first surface 6a on the front side of the board 6. As a result, the electronic parts 12 (heating elements) disposed on both sides (the first surface 6a and the second surface 6b) of the board 6 can be cooled. The intake vent 22a1 faces the electronic parts 12 that are the heating elements. As a result, the electronic parts 12 that are the heating elements are readily cooled by the air flow flowing through the intake vent 22a1.

Figure 7:
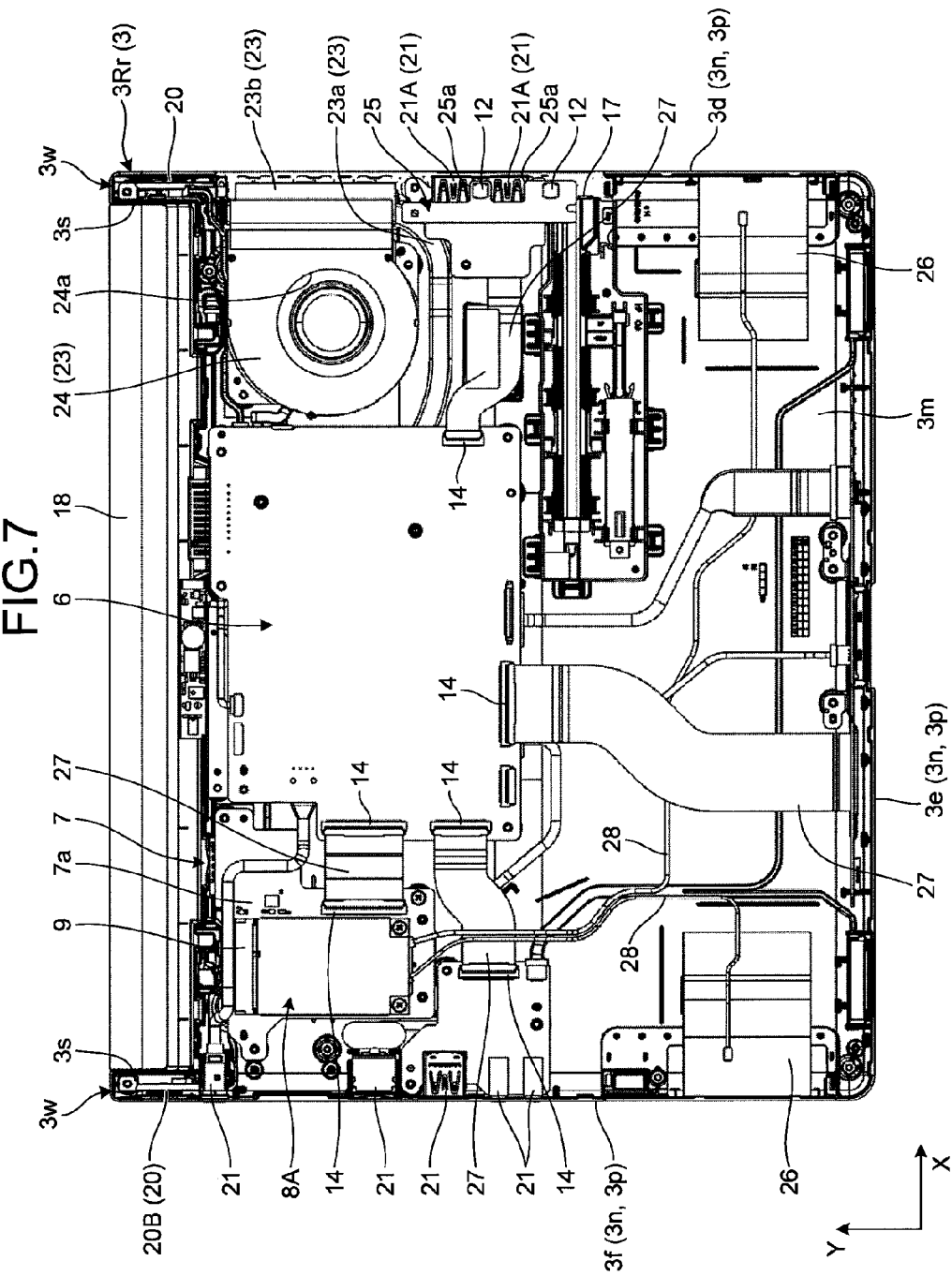
FIG. 7 is an exemplary plan view illustrating an internal structure of the television receiver in the embodiment.

In the embodiment, as exemplarily illustrated in FIG. 8, the board 7 and modules 8A and 8B are arranged along the display 4. The electronic parts 12 are mounted on the board 25. As illustrated in FIG. 7, the housing 3 houses flexible cables 27. The flexible cables 27 electrically connect the boards 6, 7, and 25, the display 4, and the connector 19 with each other. Examples of the flexible cable 27 include a flexible printed wiring board and a flat cable.

As illustrated in FIG. 7, the housing 3 houses a plurality of antennas 26. In the embodiment, the antennas 26 are coupled to a communications module (e.g., the module 8B in FIG. 8) and arranged apart from each other. In the embodiment, one of the antennas 26 is disposed near the edges 3d and 3e (near the corner 3h) of the housing 3 and the other antenna 26 is disposed near the edges 3e and 3f (near the corner 3i) of the housing 3, for example. As a result, space diversity can be achieved by the antennas 26, for example. The antenna 26 and the module 8B are electrically connected with a cable 28. The antennas 26 can be separately used on the basis of functions. For example, one of the antennas 26 is used for receiving and transmitting and the other antenna 26 is used only for receiving. For another example, one of the antennas 26 can be used as the backup of the other antenna 26.

Stand

Figure 9:
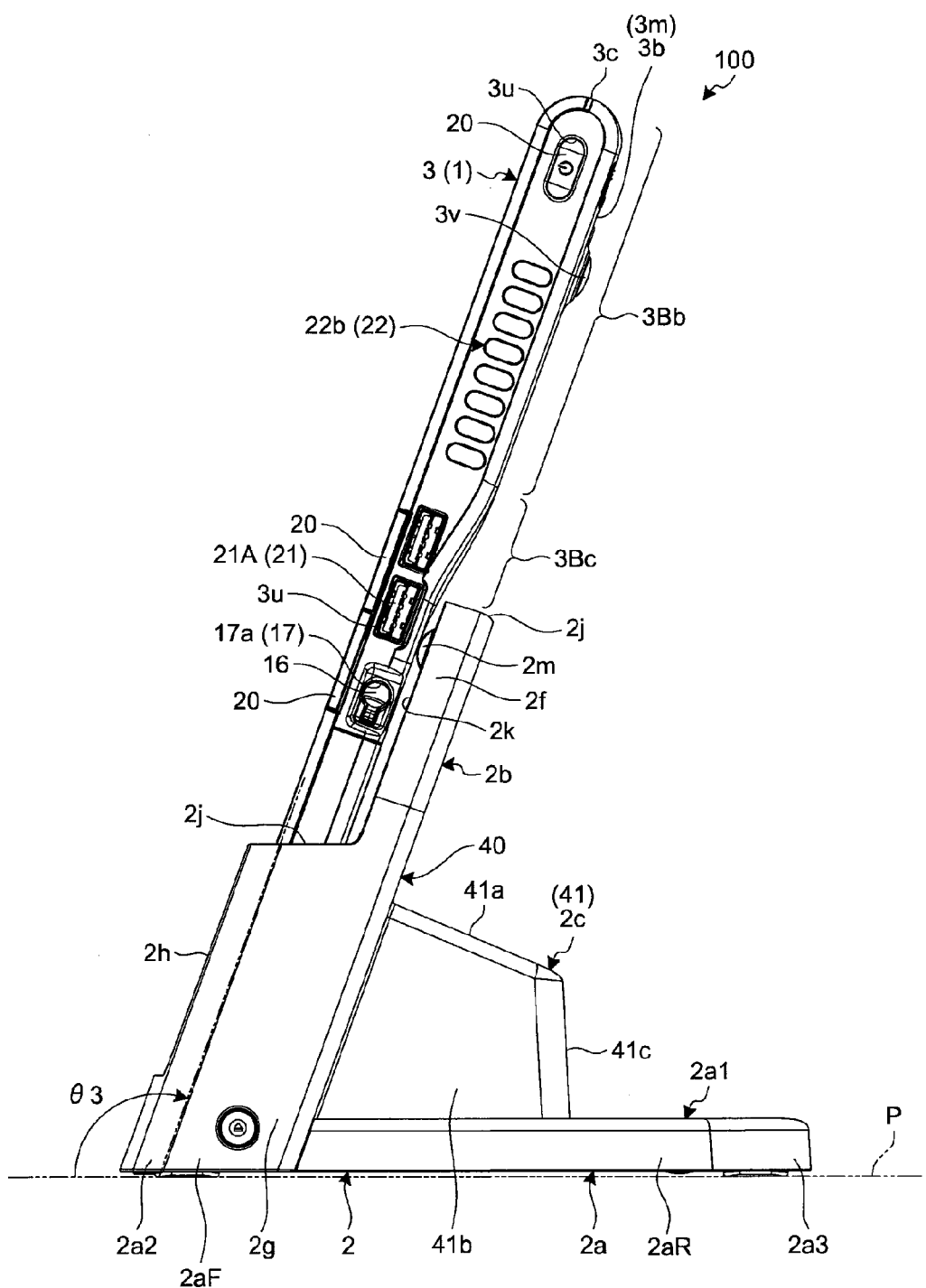
FIG. 9 is an exemplary side view illustrating the stand in the embodiment and the television receiver held by the stand.

In the embodiment, as exemplarily illustrated in FIG. 9, the stand 2 comprises a first portion 2a and a second portion 2b. The first portion 2a is placed on the placement surface P and functions as a base (a pedestal, a bottom, a lower portion, a foundation, a ground, a ground portion, a placement portion, a leg portion, a leg, a fall down suppression portion, or a suppression portion). The second portion 2b protrudes from (the bottom of) the first portion 2a on the placement surface P and holds the housing 3 of the television receiver 1 in a predetermined posture (position). That is, the second portion 2b (a first supporting wall or a second supporter) functions as a holder (a standing portion, a vertical portion, an upper portion, a receiver, a holding portion, a covering portion, an abutting portion, a contact portion, or a guiding portion). The housing 3 is placed on a placement portion 2aF (a first supporter) of the first portion 2a. The portion located on a side farther from the second portion 2b than the placement portion 2aF in the first portion 2a is a second supporting wall 2aR (a third supporter). The first portion 2a and the second portion 2b do not need to be completely divided into parts. Either portion may be a part of the other portion. In the embodiment, the stand 2 comprises a protrusion 2c (a part or a fourth supporter), which is located between the first portion 2a and the second portion 2b, and protrudes above the first portion 2a and from the back of the second portion 2b. The protrusion 2c functions as a part storage 41 that houses parts. Meanwhile, the protrusion 2c functions as a supporter that supports the second portion 2b while interposed between the first portion 2a and the second portion 2b. The stand 2, the first portion 2a, the second portion 2b, and the protrusion 2c are an example of a supporter that supports the television receiver 1 (electronic apparatus). The first portion 2a, the second portion 2b, and the protrusion 2c can be embodied by various specifications (shapes, structures, and the number of portions and protrusions). The stand 2 is mechanically and electrically connected to the television receiver 1 (electronic apparatus) positioned at a predetermined position (an attachment position, a hold position, or a placement position) of the stand 2.

The stand 2 can provide various functions relating to the attached television receiver 1 (electronic apparatus). For example, the stand 2 can have a function to support (hold) the display screen 4a in a standing state. In this case, the stand 2 can have a function to adjust the angle of the display screen 4a (the posture of the television receiver 1). The stand 2 can function as a charging apparatus of the television receiver 1, for example. In this case, the stand 2 can function as the charging apparatus electrically wired to the television receiver 1 and also as the charging apparatus that supplies power wirelessly (wireless power supply) to the television receiver 1. In this case, a wireless power supply module is provided in the second portion 2b, for example. The stand 2 can function as a connector module (a connector hub or a relaying device of data and signals) that increases the number of connectors electrically connected to the television receiver 1, for example. The stand 2 can function as a speaker of the television receiver 1, for example. The stand 2 can have a function to cool the television receiver 1, for example. In this case, a ventilation path and a fan are provided inside a housing 40 of the stand 2. Air passing through the ventilation path can assist or enhance cooling of the television receiver 1. The ventilation path can have an opening that faces the vent 22 of the television receiver 1. The stand 2 may have a cooling module that faces the television receiver 1, for example. The stand 2 can have a function of an alternating current (AC) adaptor, for example.

In the embodiment, as exemplarily illustrated in FIGS. 13, 14, 17, and 18, the stand 2 has at least partially a hollow structure. The stand 2 comprises the housing 40. The housing 40 houses at least some of the various parts such as boards 42A and 42B, connectors 43 and 44, electronic parts 45 and a harness 46. The housing 40 can be made of a synthetic resin material or a metal material (in the embodiment, for example, a synthetic resin material). In the embodiment, the housing 40 has a frame 47 (a frame member, a shell member, a high stiffness member, a stiffness member, or a strengthening member; refer to FIG. 16) inside thereof, for example. The frame 47 can be made of a metal material or a synthetic resin material (in the embodiment, for example, a metal material).

The connector 43 is an example of a second connector. In the embodiment, the part storage 41, which is a part of the housing 40 and structured as the protrusion 2c, houses the board 42B, the connectors 44 and the electronic parts 45 that are disposed on the substrate 42B. In the embodiment, the board 42A is an example of a second board while the board 42B is an example of a first board. The connectors 44 are the examples of a third connector.

In the embodiment, as exemplarily illustrated in FIGS. 9 to 12, the first portion 2a has a thin shape when viewed from a side along the placement surface P (viewed as illustrated in FIG. 9) and a rectangular shape (a trapezoidal shape) in plan view perpendicular to the placement surface P, and is formed in a flat shape (a platy shape or a wall shape) along the placement surface P. In the embodiment, the second portion 2b protrudes from an edge 2a2 of the first portion 2a in a direction slightly slanted backward from the normal line of the edge 2a2 (a direction slightly slanted toward the backside of the television receiver 1 when the television receiver 1 is attached or a side close to an edge 2a3 located opposite the edge 2a2), for example. As illustrated in FIGS. 9 to 14, the second portion 2b holds (supports, grips, or sustains) a part of one of the edges of the housing 3 of the television receiver 1 (in the embodiment, for example, the edge 3e) so as to surround (cover) the part from directions excluding a direction along which the television receiver 1 is attached (inserted) to a predetermined position (a hold position or a hold region) (in the embodiment, for example, the upper direction). The directions excluding the attachment direction are the lower, the back, the sides (the left and the right), and the front directions. The area along the edge 3e (refer to FIGS. 2 and 3) can also be covered by the second portion 2b. The second portion 2b also functions as a guide that guides the housing 3 of the television receiver 1 to the predetermined position when the television receiver 1 is moved (slid, displaced, inserted, or attached) toward the predetermined position of the stand 2. That is, the second portion 2b is an example of a guide (a guiding portion, a sliding portion, or a slipping portion). In the embodiment, the second portion 2b has walls 2e to 2h, for example. The wall 2e (a first wall, a first wall portion, a bottom wall portion, or an under wall portion) is located under the housing 3 held at the predetermined position and covers the housing 3 from below. The wall 2f (a second wall, a second wall portion, a back wall portion, or a rear wall portion) is located behind (on a back side, a back surface side, a rear side, and a behind side) the housing 3 and covers the housing 3 from behind. The walls 2g (third walls, third wall portions, or side wall portions) are located on the sides close to the side surfaces of the housing 3 and cover the housing 3 from the sides. The walls 2h (forth walls, fourth wall portions, or front wall portions) are located on the front of the housing 3 and cover the housing 3 from the front. The wall 2e can be structured as a part of the first portion 2a.

In the embodiment, the stand 2 covers the television receiver 1 so as to expose a functional area of the television receiver (electronic apparatus) or keep the functional area open to the surrounding area of the stand 2. In the embodiment, as exemplarily illustrated in FIGS. 1 and 11, the second portion 2b is provided with openings 2i corresponding to the front of the television receiver 1. The openings 2i can be provided as notches or through holes (in the embodiment, for example, as notches), for example. That is, in the embodiment, the areas that are along the edges 3d and 3f located on both sides of the front surface 3a, and beyond the display screen 4a and the opening 3r of the housing 3, are covered by (the walls 2h of) the second portion 2b when the television receiver 1 is attached to the stand 2. This structure readily provides visibility of the display screen 4a, for example. A member may be provided that covers the edge 3e located under the front surface 3a of the housing 3 (for example, a part of the second portion 2b, the first portion 2a, or the housing 40, or another member different from the housing 40).

In the embodiment, the stand 2 holds the television receiver 1 so as to expose the vent 22 provided to the housing 3 of the television receiver 1, for example. As illustrated in FIGS. 2, 4, and 5, the vents 22 are provided in the second portion 3Bb and the slanted portion 3Bc of the housing 3. As apparent from FIGS. 1, 9, and 10, the vents 22 are located beyond an edge 2j (a first edge, a frame, or a side), which is the top edge of the second portion 2b, and exposed without being covered by the stand 2. As a result, this structure readily suppresses air (an air flow) flowing through the vent 22 from being hindered by the stand 2. The opening 3u of the connector 21, the opening 17a of the part storage 17, and the opening 3u of the operation module 20, which are provided to the housing 3, are exposed. As a result, in the embodiment, this structure readily suppresses approach of the part 16 or user's fingers to or operation performed on the openings 3u and 17a from being hindered by the stand 2. In addition, this structure causes the second portion 3Bb, which is an example of a region generating a large amount of heat in the housing 3, to be exposed without being covered by the stand 2. As a result, heat is readily further dissipated than when the second portion 3Bb is covered by the stand 2, for example. As another example, the cooling efficiency is readily enhanced.

Figure 11:
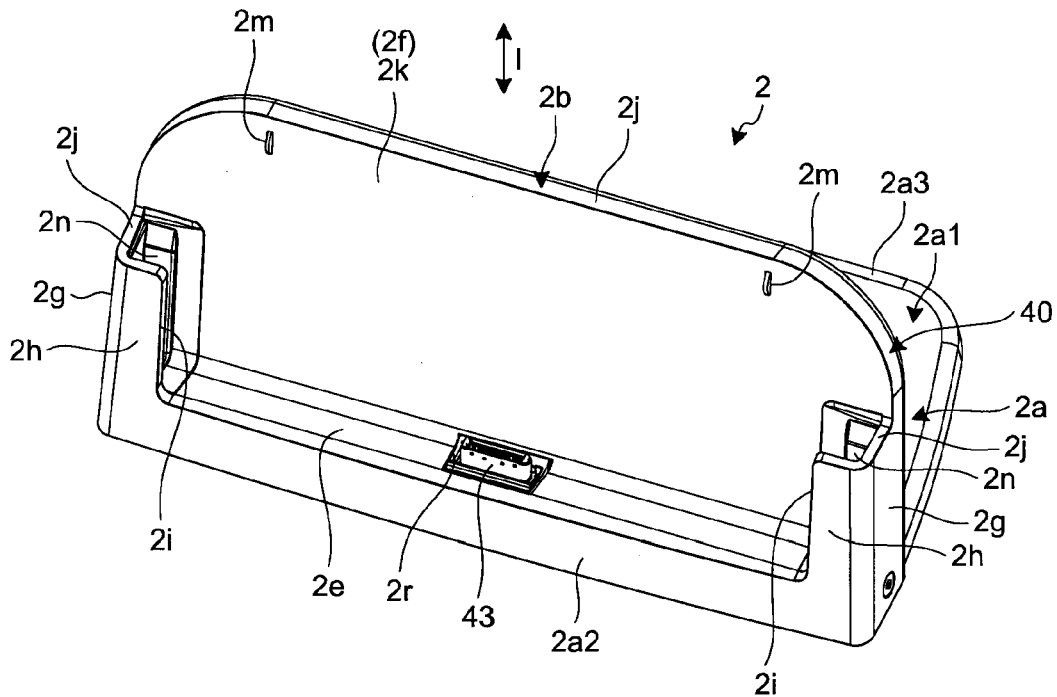
FIG. 11 is an exemplary top perspective view illustrating the stand in the embodiment.
Figure 13:
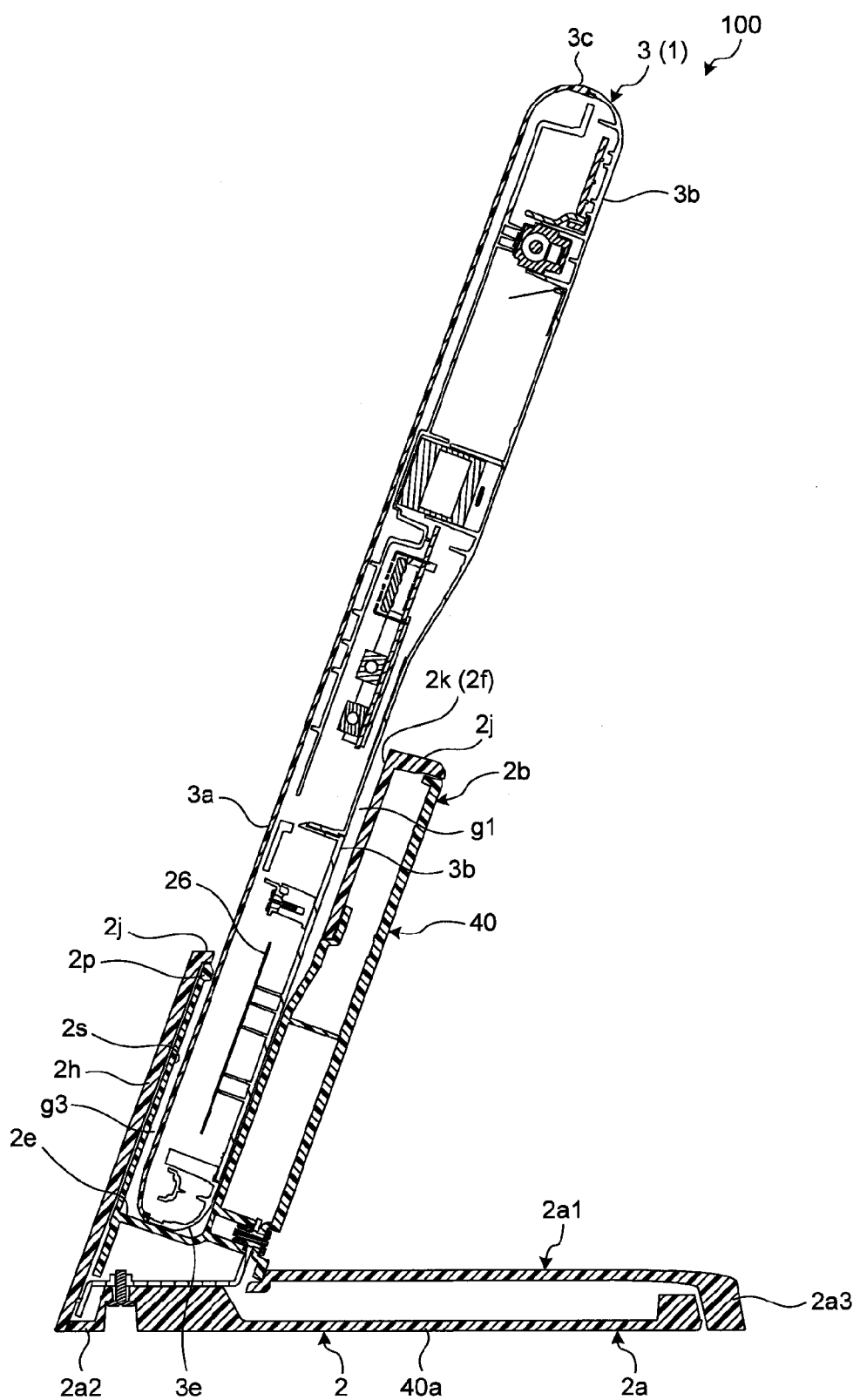
FIG. 13 is an exemplary sectional view taken along line XIII-XIII of FIG. 1.
Figure 14:
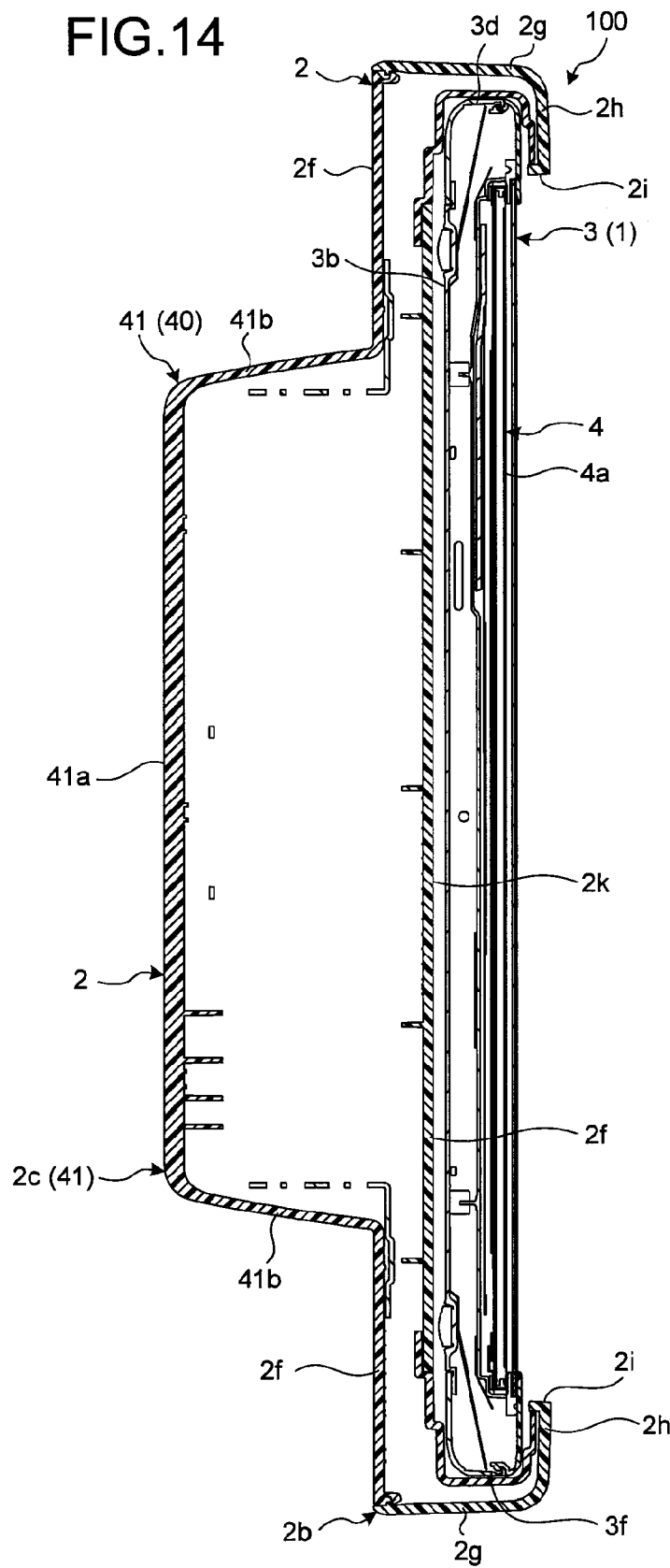
FIG. 14 is an exemplary sectional view taken along line XIV-XIV of FIG. 1.

In the embodiment, as exemplarily illustrated in FIGS. 9, 11, and 13, a surface 2k (front surface) of the wall 2f that supports the housing 3 is provided with protrusions 2m and 2n (projections). Specifically, as illustrated in FIG. 11, a plurality of protrusions 2m (in the embodiment, for example, two protrusions 2m) are arranged with a distance therebetween along the edge 2j of the wall 2f. Each protrusion 2m extends along a move-in/out direction I (a go/return direction, an inserting direction, an attachment/detachment direction, or an attachment direction) of the housing 3 to the stand 2 with a nearly constant width. As illustrated in FIG. 9, the outer rim (the end, the front rim, the tip, or the front edge) of the protrusion 2m is curved outward in the normal direction of the wall 2f. As illustrated in FIG. 11, a plurality of protrusions 2n (in the embodiment, e.g., two protrusions 2n) are arranged along the edges between the walls 2g. Each protrusion 2n extends along the move-in/out direction I of the housing 3 to the stand 2 with a nearly constant width. As illustrated in FIG. 13, the outer rim (the end, the front rim, the tip, or the front edge) of the protrusion 2n extends in a planate shape in parallel with the surface 2k and along the surface 2k of the wall 2f. The protrusions 2m and 2n make contact with the back surface 3b (the surface or the second surface) of the housing 3. The protrusions 2m and 2n are arranged at different positions along the move-in/out direction I of the housing 3 to the stand 2 so as to be apart from each other and arranged at different positions along a direction perpendicular to the move-in/out direction I so as to be apart from each other. As a result, according to the embodiment, the housing 3 of the television receiver 1 positioned at the predetermined position is more stably supported by the protrusions 2m and 2n, which are arranged at a plurality of positions so as to be apart from each other behind (on the back side, the back surface side, the rear side, or the behind side of) the housing 3. In addition, as illustrated in FIG. 13, the surface 2k of the wall 2f and the back surface 3b of the housing 3 are apart from each other with a gap g1 interposed between the surface 2k and the back surface 3b. As a result, in the embodiment, the gap g1 suppresses the housing 3 of the television receiver 1 (electronic apparatus) from hardly moving with respect to the stand 2 due to the increase of friction force caused by contact between the surface 2k and the back surface 3b, for example. As another example, air readily flows through the gap g1 as an air flow, resulting in the cooling performance being readily enhanced, for example. In the embodiment, as exemplarily illustrated in FIG. 13, protrusions 2p are provided to the rear surfaces (the back sides, the back surface sides, the rear sides, or the behind sides) of the walls 2h, for example. The protrusions 2p make contact with the front surface 3a (the surface or the first surface) of the housing 3. A gap g3 is provided between the front surface 3a of the housing 3 and surfaces 2s (rear surfaces or back surfaces) of the walls 2h. The protrusions 2p can also contribute to a more stable hold of the housing 3 of the television receiver 1 at the predetermined position.

Figure 15:
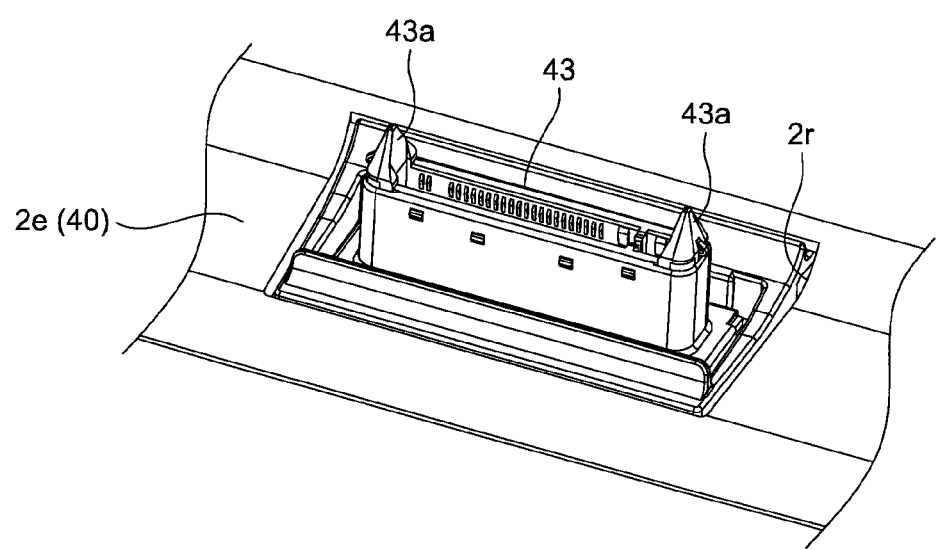
FIG. 15 is an exemplary perspective view illustrating a part of the stand in the embodiment.
Figure 17:
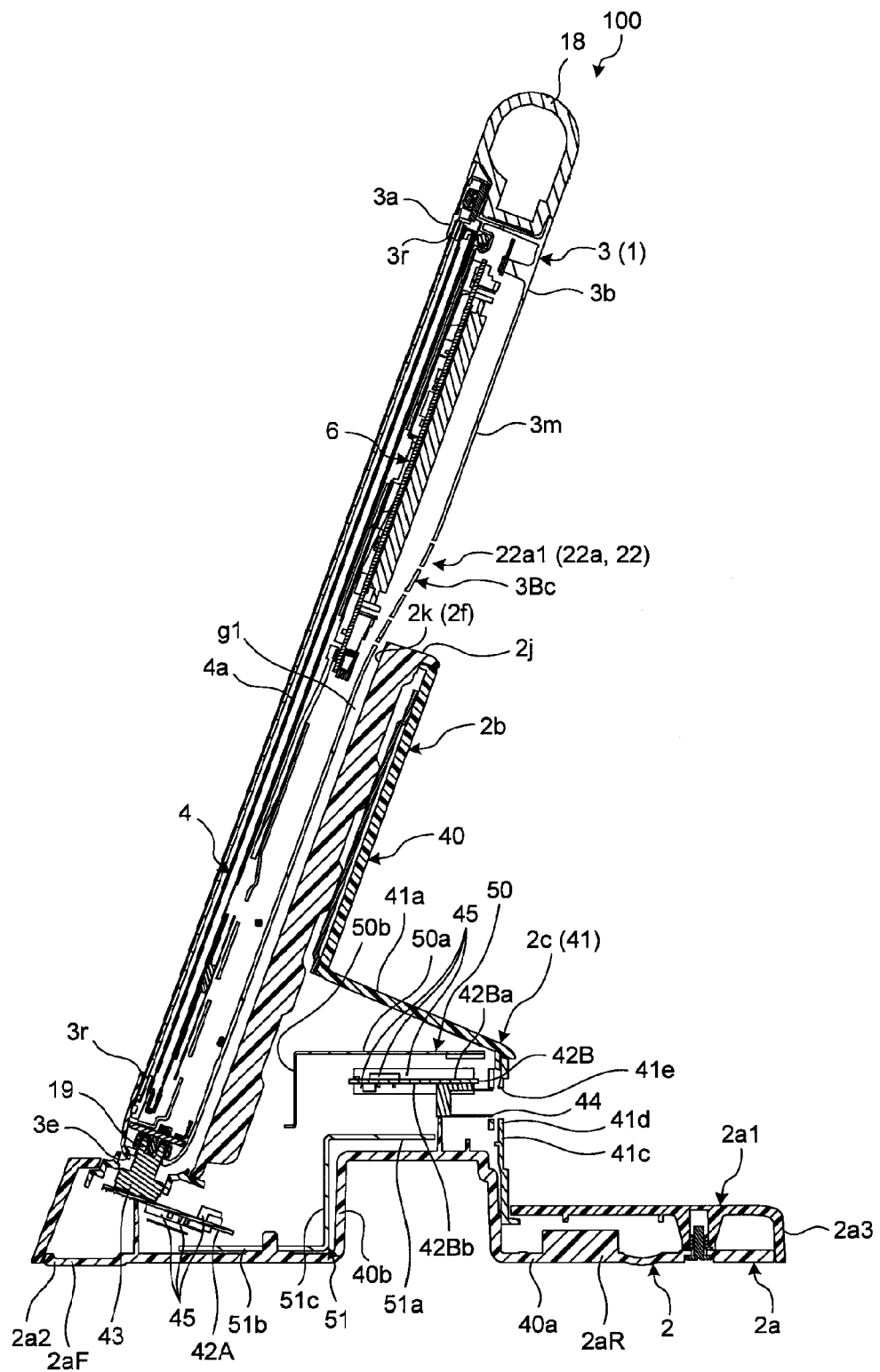
FIG. 17 is an exemplary sectional view taken along line XVII-XVII of FIG. 1.
Figure 18:
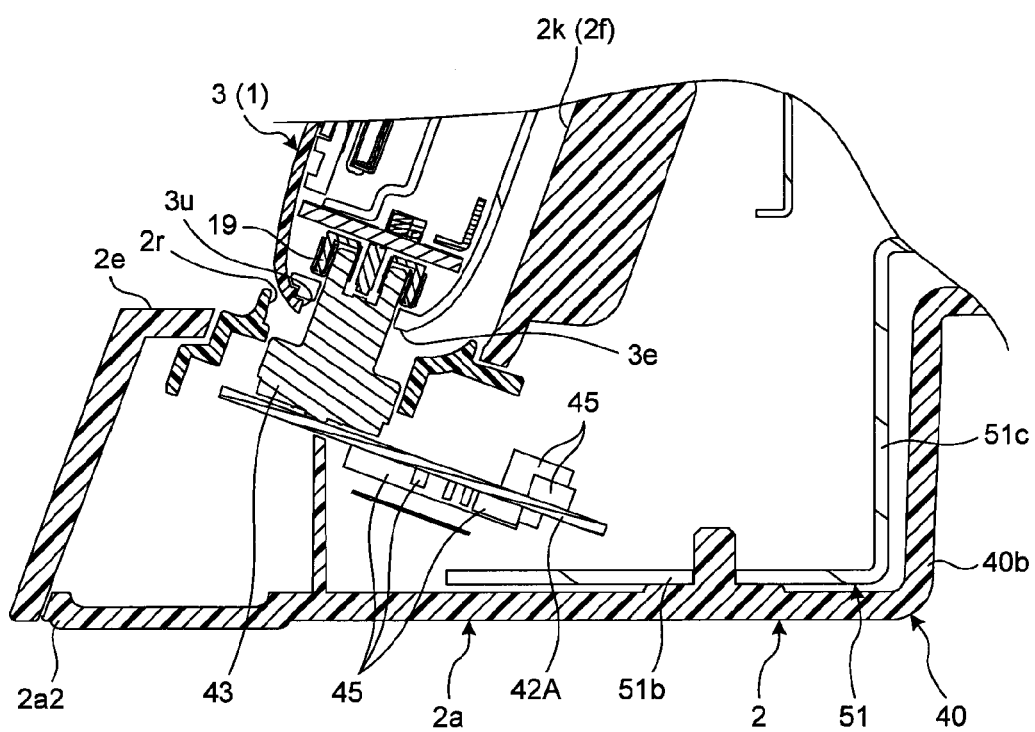
FIG. 18 is an exemplary enlarged view of apart of the sectional view of FIG. 17.
Figure 19:
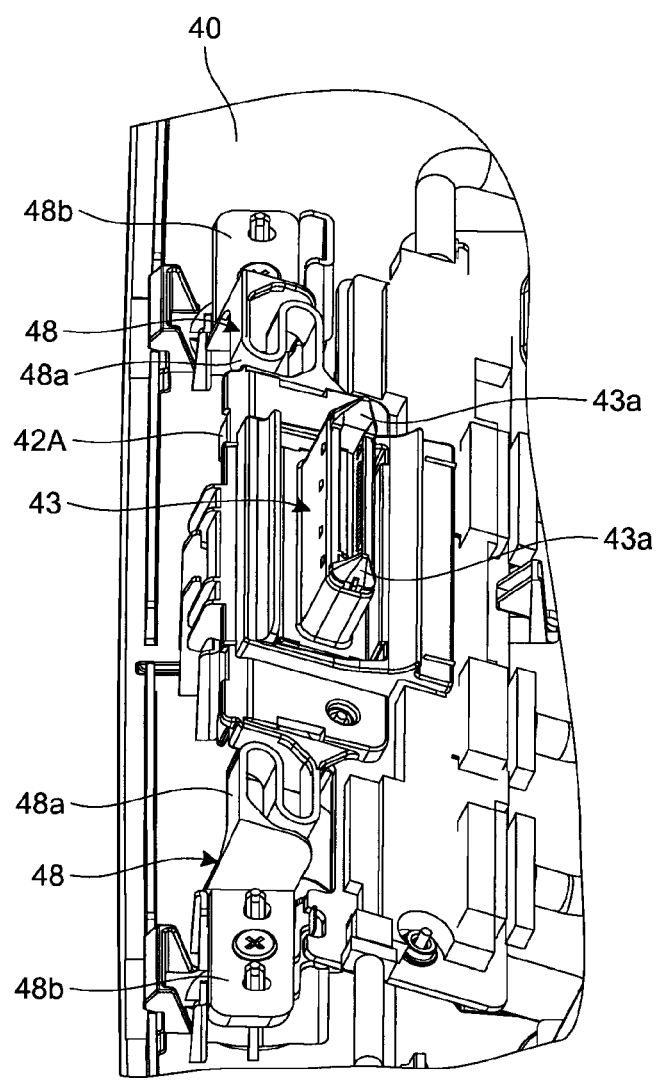
FIG. 19 is an exemplary perspective view illustrating a part of an internal structure of the stand in the embodiment.

In the embodiment, as exemplarily illustrated in FIGS. 11 and 15, the wall 2e is provided with an opening 2r, out of which the connector 43 is exposed and protrudes upward. As illustrated in FIGS. 17 and 18, the connector 43 is electrically connected to the connector 19 inside the housing 3 by being put in through the opening 3u of the housing 3 of the television receiver 1. The connector 43 has protrusions 43a (projections or guides) at corners serving as side edges and top edges of the connector 43, the protrusions 43a serving as a guide when the connector 43 is connected to the connector 19.

In the embodiment, as exemplarily illustrated in FIGS. 16 to 19, the connector 43 is fixed on the board 42A. In the embodiment, as exemplarily illustrated in FIGS. 16 and 19, the connector 43 and the board 42A are supported by the housing 40 through elastic modules 48. Specifically, the elastic module 48 comprises an elastic material (for example, a metal material, a synthetic resin material, and elastomer) in at least a part thereof (an arm portion 48a). The elastic module 48 has the arm portion 48a (an extension portion, a suspension, a connector, an extending portion, a bridging portion, a displacement portion, or an elastic deformation portion) and a fixture 48b. The arm portion 48a extends between the board 42A on which the connector 43 is fixed and the fixture 48b fixed on the housing 40. Elastic force (elastic repulsive force), a hardness, a displacement amount, and insertion force (pushing force at the attachment) of the elastic module 48 can be adjusted depending on the specifications (such as the material, the shape, the set direction, the length, the width, the height, the thickness, and a curvature of the curved portion) of the arm portion 48a. The arm portion 48a is bent into a sigmoid shape, for example. The fixture 48b is fixed to the housing 40 by a joint such as a screw 49. In the embodiment, the connector 43 is supported by the two elastic modules 48 at both ends thereof, for example. That is, the connector 43 is interposed between the two elastic modules 48. This structure facilitates the connector 43 to be more stably supported than when the connector 43 is supported in a cantilever fashion, for example. In the embodiment, the arm portion 48a is the member that has a belt-like and platy shape with a surface along the move-in/out direction of the housing 3 of the television receiver 1 to the stand 2, and bends along a direction intersecting with the move-in/out direction (in the embodiment, for example, along the direction or the surface perpendicular to the move-in/out direction), for example. This structure allows the arm portion 48a to be readily displaced in the direction intersecting with the move-in/out direction while the structure allows the arm portion 48a to be hardly displaced in the move-in/out direction. As a result, according to the embodiment, when the housing 3 of the television receiver 1 is shifted in the direction intersecting with the move-in/out direction from the predetermined position, the connecter 43 is readily moved so as to correspond to the shift, for example.

That is, the connector 43, which can be elastically displaced, readily absorbs the shift of the connector 43 with respect to the predetermined position of the connector 19. According to the embodiment, the connector 43 can be more tightly held against the movement of the connector 19 of the television receiver 1, which moves along the move-in/out direction, for example. As a result, the television receiver 1 (electronic apparatus) is readily attached to and detached from the stand 2, for example. That is, according to the embodiment, by providing the elastic modules 48 (the arm portions 48a) with differing elasticity (stiffness) depending on the direction, both the ease of absorbing (taking action to) the position shift and the ease of attachment/detachment of the television receiver 1 are readily achieved, for example.

In the embodiment, as exemplarily illustrated in FIG. 17, the board 42B provided with connectors 44 is disposed inside the housing 40 in addition to the board 42A provided with the connector 43 to which the connector 19 of the television receiver 1 (electronic apparatus supported by the stand 2) is connected. Examples of the connector 44 include a power source connector, a video signal connector (such as an HDMI connector, a digital (D) terminal connector, or a digital video (DV) terminal connector), an audio signal connector (such as a phone terminal connector or a DIN connector), a data signal connector (such as a USB connector, a local area network (LAN) connector, or a recommended standard 232C (RS-232C) connector), a radio wave connector (such as a coaxial cable connector), and an optical fiber connector. That is, in the embodiment, a plurality of boards (in the embodiment, for example, two boards), i.e., the boards 42A and 42B, are disposed inside the housing 40. The board 42B is located apart from the board 42A. In the embodiment, the board 42B is located behind the board 42A (on the side farther from the display screen 4a than the board 42A), for example. In addition, the boards 42A and 42B are located apart from each other in the height direction. In the embodiment, the board 42B is located at a higher position than the board 42A (farther from the placement surface P). This arrangement, in which the boards 42A and 42B are disposed apart from each other, readily increases flexibility of the layout of parts and structures the stand 2 more compact, for example. As another example, the positions of the connectors 44 disposed on the board 42B can be set regardless of the positions of the board 42A and the connector 43. As a result, the arrangement can readily suppress approach of parts or user's fingers to or operation performed on the connectors 44 from being hindered, for example. In addition, the connectors 44 can be disposed at positions that make it easier for parts or user's fingers to approach the connectors 44, or easier to perform operation on the connectors 44.

Figure 16:
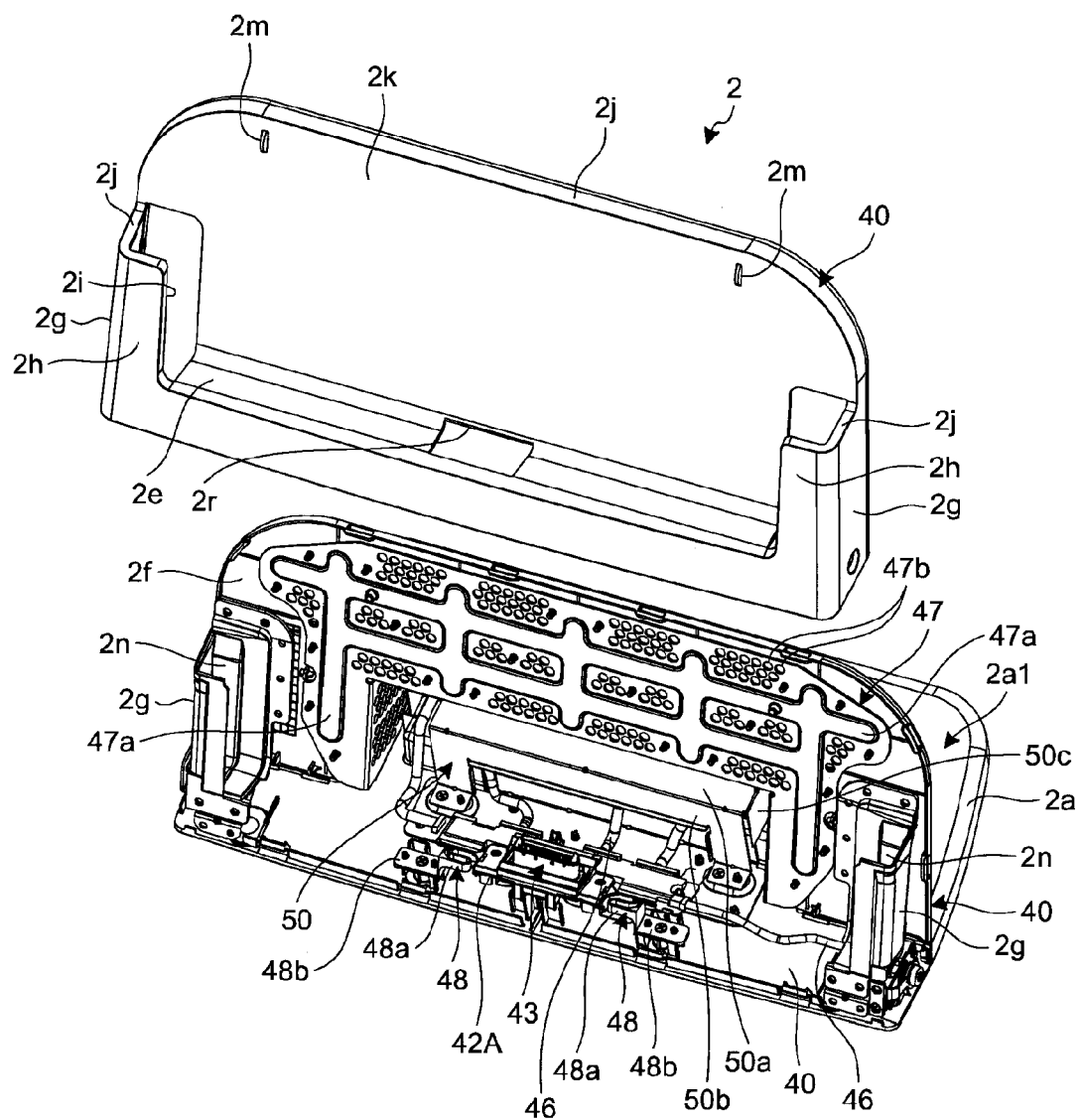
FIG. 16 is an exemplary exploded perspective view illustrating the stand in the embodiment.

In the embodiment, as exemplarily illustrated in FIGS. 16 and 17, the board 42B, and the connectors 44 and the electronic parts 45, for example, mounted on the board 42B are covered by shields 50 and 51 (shielding modules, covering members, covering modules, surrounding members, covers, masking members, conductors, or conductive members) inside the part storage 41 (the housing 40). Specifically, the shield 50 has a plurality of walls 50a to 50c. The shield 51 has a plurality of walls 51a to 51c. The board 42B has a surface 42Ba (a first surface or an upper surface) and a surface 42Bb (a second surface or a lower surface) located opposite the surface 42Ba. The surfaces are disposed so as to extend in the same direction as that of the placement surface P (in the embodiment, for example, in parallel with each other). The wall 50a is disposed in the same direction as the surfaces 42Ba and 42Bb of the board 42B (in the embodiment, for example, in parallel with each other) and covers the board 42B from the above. The wall 50b extends in a direction intersecting with the wall 50a (in the embodiment, for example, a direction perpendicular to the wall 50a) and covers the board 42B from the front (the television receiver 1 side). Each of the walls 50c extends in a direction intersecting with the walls 50a and 50b (in the embodiment, for example, a perpendicular direction) and covers the board 42B from the sides (the left and the right sides of the television receiver 1 when viewed from the front or the left and right sides in FIG. 16). The wall 51a is disposed in the same direction as the surface 42Bb of the board 42B (in the embodiment, for example, in parallel with each other) and covers the board 42B from below. The shields 50 and 51 are made of a conductive material or a magnetic material, for example. In this way, in the embodiment, the board 42B, and the connectors 44 and the electronic parts 45 disposed on the board 42B are covered by the shield 50 (the walls 50a to 50c) and the shield 51 (the wall 51a), for example. As a result, this structure readily suppresses noises from mixing into electrical signals in the board 42B, the connectors 44, and a circuit including the electronic parts 45, and readily suppresses adverse effects on the electrical signals, for example. In addition, the shields 50 and 51 readily increase the stiffness of the housing 40, for example. In addition, the shield 50 readily further increases the stiffness of the housing 40 because the shield 50 is formed in a box shape, for example. In the embodiment, as exemplarily illustrated in FIG. 17, the shield 51 has the wall 51b disposed so as to extend in the same direction as that of the wall 51a (in the embodiment, for example, in parallel with each other) and disposed at a position closer to the placement surface P than (at a lower position than) the wall 51a so as to be apart from the wall 51a and the wall 51c extending between the wall 51a and the wall 51b and in a direction intersecting with the walls 51a and 51b (in the embodiment, for example, a direction perpendicular to the walls 51a and 51b). As a result, according to the embodiment, the shield 51 readily further suppresses noises from mixing into electrical signals, for example. As another example, the shield 51 readily further increases the stiffness of the housing 40. According to the embodiment, the shields 50 and 51 can function as a part of the frame 47, for example. In the embodiment, as exemplarily illustrated in FIG. 16, the frame 47 is disposed along the wall 2f inside the housing 40. The frame 47 has a platy shape and is provided with a plurality of protrusions 47a (shell portions) and a plurality of through holes 47b. As a result, this structure enables the weight of the frame 47 to be further reduced and the stiffness of the housing 40 to be readily increased, for example. In the embodiment, the frame 47 is made of a conductor (a conductive material) and is electrically connected to the shields 50 and 51, which are connected to the ground potential, for example. As a result, in the embodiment, noises are readily further suppressed from mixing into electrical signals, for example. The frame 47 is an example of the shields. The shields 50 and 51 are the examples of the frame.

In the embodiment, as exemplarily illustrated in FIGS. 13 and 16, the shields 50 and 51 or the frame 47 are not disposed in the area corresponding to the walls 2g and 2h of the second portion 2b. The walls 2g and 2h are made of a non-conductor (a non-conductive material such as a synthetic resin material). The antennas 26 (refer to FIG. 7) are located in the areas corresponding to the walls 2g and 2h when the television receiver 1 is attached to the stand 2. As a result, according to the embodiment, the shields 50 and 51 or the frame 47 readily suppresses communications performance of the antennas 26 from deteriorating, for example. That is, in the embodiment, the areas corresponding to the antennas 26 are electromagnetically exposed (covered by no conductors) on at least one side (in the embodiment, on the front side and the both sides of the stand 2 when viewed from the front of the display screen 4a of the television receiver 1 attached to the stand 2, for example), for example.

In the embodiment, as exemplarily illustrated in FIGS. 9, 10, 12, and 17, the part storage 41 has a wall 41a (an upper wall, a ceiling wall, or a first wall) located on the upper side, walls 41b (a side wall, a vertical wall, an upright wall, a standing wall, or a second wall) located on both left and right sides when viewed from the rear (from the front) thereof, and a wall 41c (a back wall, a rear wall, or the second wall) located on the back side (a behind side). The walls 41b are the examples of the side edges of the part storage 41. The wall 41c is an example of the back edge of the part storage 41.

Figure 10:
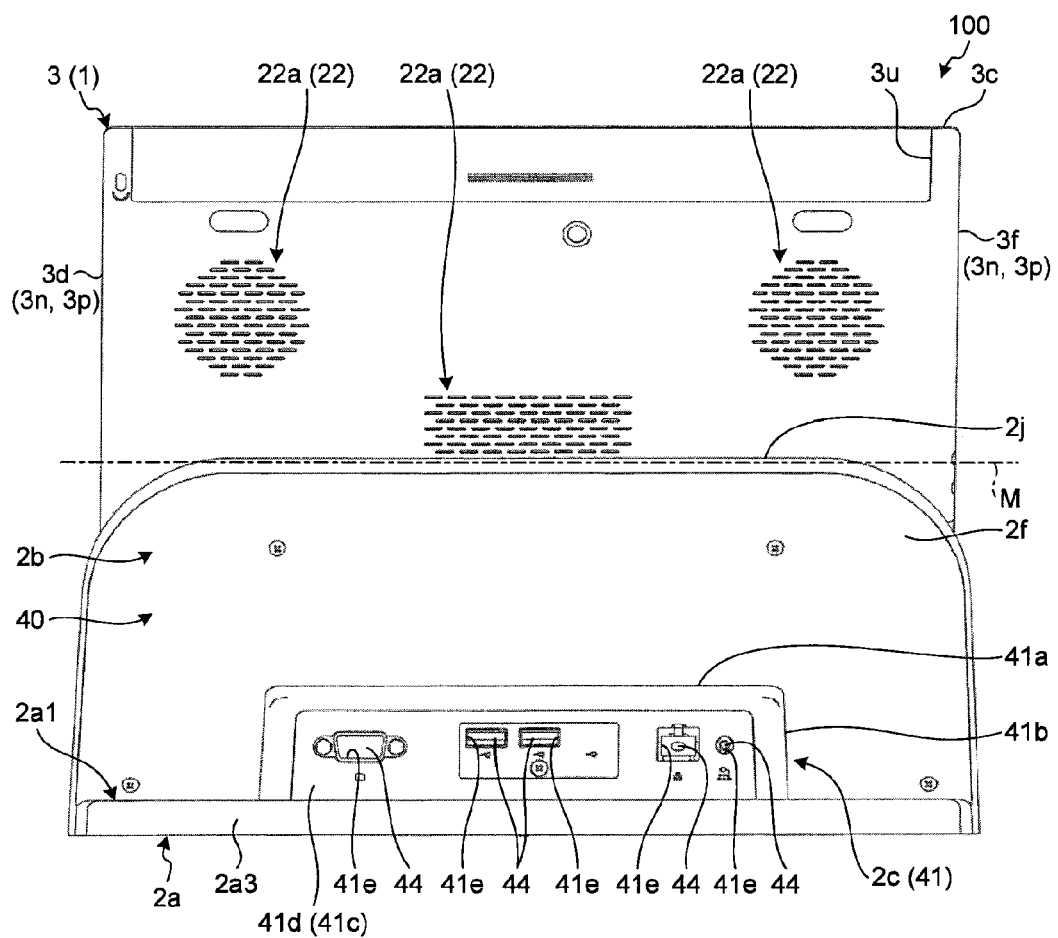
FIG. 10 is an exemplary rear view illustrating the stand in the embodiment and the television receiver held by the stand.
Figure 12:
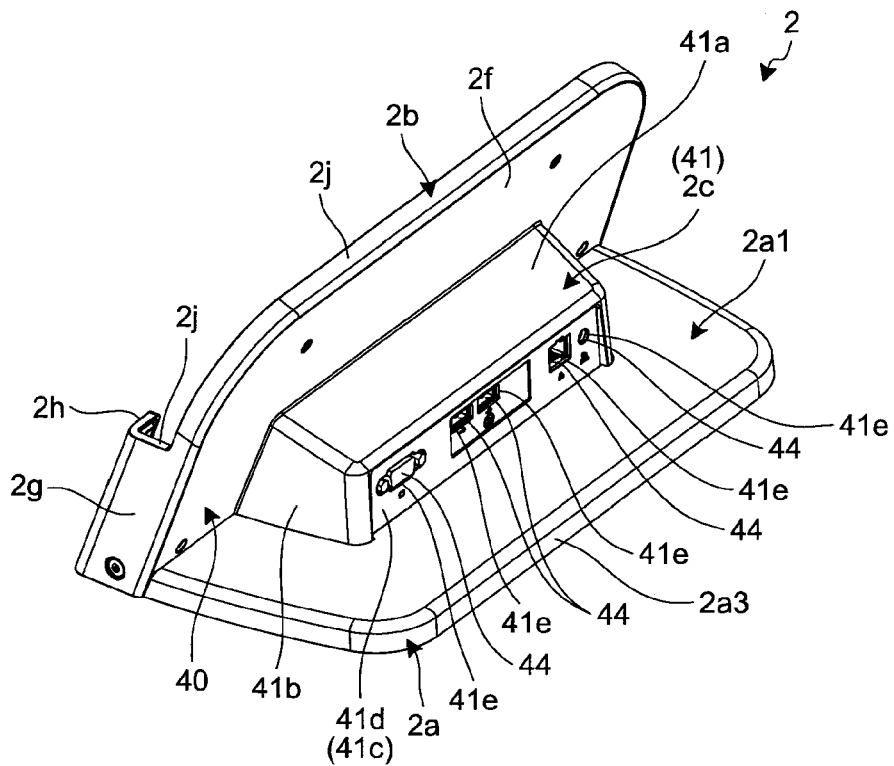
FIG. 12 is an exemplary top perspective view, from a different angle than that of FIG. 11, illustrating the stand in the embodiment.

In the embodiment, as exemplarily illustrated in FIGS. 10, 12, and 17, the connectors 44 are exposed through the openings 41e provided to a surface 41d of the wall 41c of the part storage 41 (the housing 40). In the embodiment, an edge 2a3 (a first edge) of the first portion 2a is located on an open side of the connector 44 (an open side of the opening 41e, or a side close to the opening, and in the embodiment, for example, behind the wall 41c) so as to be apart from the wall 41c (the surface 41d or the edge), for example. That is, in the embodiment, the first portion 2a is provided with a protrusion 2a1 (a bulge, a flange, an extension portion, a circumference portion, a fringe, a bottom, a bed, a leg, or a wall) that protrudes from behind the wall 41c, for example. In the embodiment, the protrusion 2a1 has a platy shape as an example. The protrusion 2a1, however, can be formed in various shapes. For example, the protrusion 2a1 may be formed in a belt-like shape, a rod shape, a mesh shape, or a ring shape. In addition, the protrusion 2a1 can be provided with openings such as notches and through holes or areas having ridges and valleys. In the embodiment, the protrusion 2a1 is disposed under connectors 70 connected to the connectors 44, cables (harnesses or wiring lines, refer to FIG. 17), sockets (not illustrated) and bodies (not illustrated) connected to the connectors 70, and covers them from below. That is, the protrusion 2a1 is an example of a covering module (a covering portion or a protector). Because the protrusion 2a1 protrudes from the wall 41c, the protrusion 2a1 suppresses the connectors connected to the connector 44 or the cables from being hit by other goods (walls, apparatuses, or parts). That is, the protrusion 2a1 is an example of a suppression module (the protector). The protrusion 2a1 extends along the placement surface P (refer to FIG. 9) in a direction intersecting with the direction toward the edge 2a3 (in the embodiment, for example, a direction perpendicular to the direction or the left-right direction when viewed from the front and the rear). That is, the protrusion 2a1 protrudes sideways from the walls 41b. As a result, a space (region) for providing the connectors and the cables are readily allocated above the protrusion 2a1, for example. The protrusion 2a1 can be provided with a mechanism that hooks or fastens the cables (for example, a protrusion, a wall, a recess, a grove, a mooring portion, or a hook). The wall 41b may be provided with the openings 41e, which expose the connectors 44.

In the embodiment, as exemplarily illustrated in FIG. 17, the housing 40 is shaped in such a manner that a wall 40a (a bottom wall or a bottom) is depressed (protruded) while a protrusion 40b (a depressed portion) protrudes in a direction away from the placement surface P (in an upward direction). The board 42B is fixed to the protrusion 40b by a joint (not illustrated) such as a screw. As a result, according to the embodiment, the structure in which the board 42B is located away from the placement surface P can be obtained as a simpler structure, for example. In addition, the protrusion 40b readily increases the stiffness of the housing 40, for example.

In the embodiment, as exemplarily illustrated in FIG. 10 and described above, the vents 22 provided to the wall 3m of the housing 3 are exposed on a side close to the edge 3c beyond the edge 2j of the second portion 2b of the stand 2. As a result, according to the embodiment, the vents 22 exposed without being covered by the stand 2 facilitate an air flow to be formed inside the housing 3 while the housing 3 is more reliably held by the stand 2. In the embodiment, the second portion 2b of the stand 2 extends from the placement surface P to an intermediate position M (a central position, refer to FIGS. 4 and 10) between the edges 3c and 3e of the housing 3 (refer to FIG. 1) or to a position located on the side close to the edge 3c beyond the intermediate position M (in the embodiment, for example, to the intermediate position M), for example. As a result, the stand 2 can support the housing 3 more stably, for example.

In the embodiment, as exemplarily illustrated in FIG. 10, the vents 22 (in the embodiment, for example, the intake vents 22a) are provided to the wall 3m in such a manner that one is provided on a side (a side close to the edge 3d) and the other is provided on another side (a side close to the edge 3f) apart from each other in a direction along the edge 3c. As a result, according to the embodiment, air flows with a wider range can be formed inside the housing 3 through the vents 22, for example. Consequently, a cooling effect by the air flows with a wider range can be obtained, for example.

In the embodiment, as exemplarily illustrated in FIG. 8, the vents 22 (in the embodiment, for example, intake vents 22a) are provided to the wall 3m so as to interpose the board 6 between the vents 22 and the display 4. As a result, according to the embodiment, air readily flows along the first surface 6a, which is located opposite the wall 3m, of the board 6. That is, air readily flows on a side close to the display 4, for example. Consequently, the cooling effect of the air flow can be obtained on the side close to the first surface 6a of the board 6, for example.

In the embodiment, as exemplarily illustrated in FIG. 8, the fan 24 is provided inside the housing 3, and the intake vent 22a (the vent 22) overlaps with at least a part of the air intake vent 24a of the fan 24. This structure enables the operation (rotation) of the fan 24 to form air flows more efficiently inside the housing 3.

In the embodiment, as exemplarily illustrated in FIG. 8, an intake vent 22a1 (the vent 22) overlapping with at least a part of the board 6, and intake vents 22a2 and 22a3 (the vents 22) located out of the board 6, are provided to the wall 3m. This structure readily cools the electronic parts 12, which are heating elements, disposed on the board 6, and at the same time forms an air flow on the opposite side of the wall 3m of the board 6, which facilitates the cooling effect by the air flow.

In the embodiment, as exemplarily illustrated in FIG. 17, at least one (the intake vent 22a1) of the vents 22 is covered by the stand 2 with the gap g1 between the wall 3m and the second portion 2b (the stand 2). Although the vent 22 (the intake vent 22a1) is covered by the stand 2, the gap g1 enables air to flow efficiently via the gap g1.

In the embodiment as exemplarily illustrated in FIG. 17, the wall 3m has the slanted portion 3Bc that slants with respect to the display screen 4a and at least one (the intake vent 22a1) of the vents 22 is provided to the slanted portion 3Bc. As illustrated in FIG. 5, the slanted portion 3Bc enables a gap g2 to be provided between the placement surface P and the back surface 3b (the wall 3m) when the housing 3 is placed on the placement surface P. As a result, air can efficiently flow through the vent 22 (the intake vent 22a1) through the gap g2.

Modified Example 1

Figure 20:
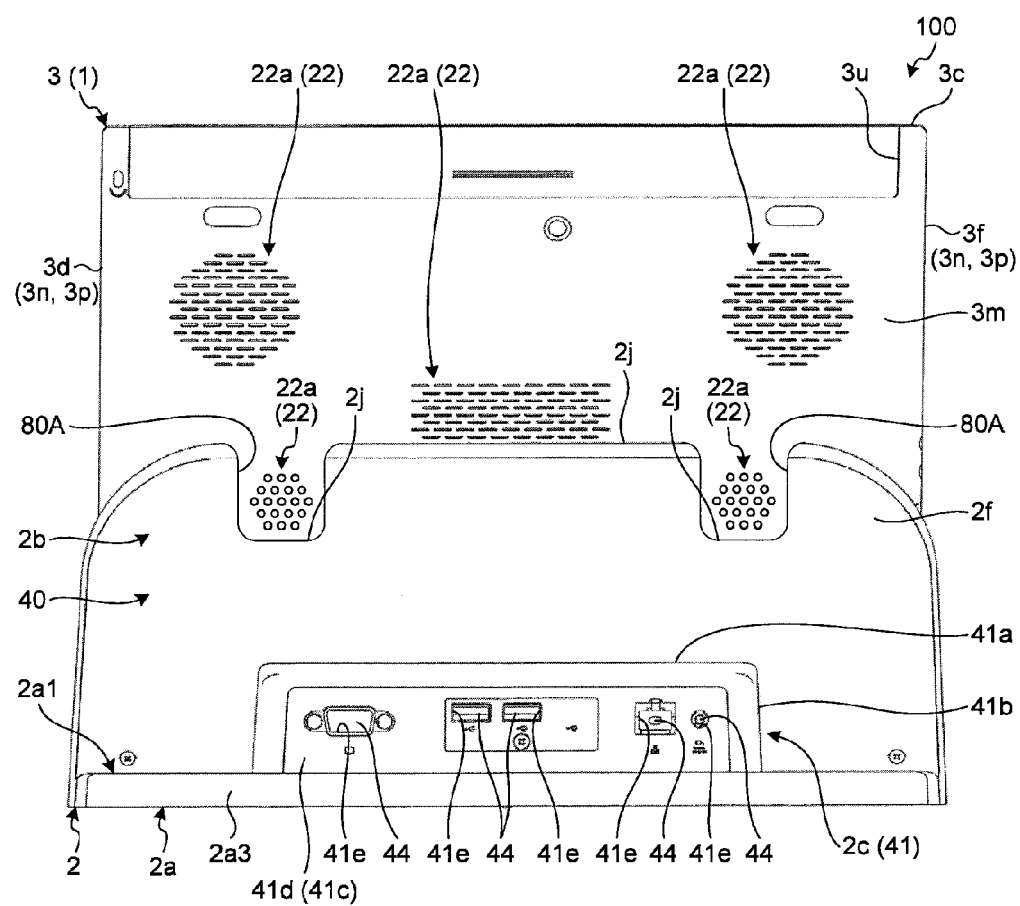
FIG. 20 is an exemplary rear view illustrating a stand according to modified example 1 and a television receiver held by the stand.

In modified example 1, as exemplarily illustrated in FIG. 20, the stand 2 has openings 80A. The modified example is the same as the above-described embodiment except for that the openings 80A are provided. The openings 80A are provided to the edge 2j of the wall 2f that covers the back surface 3b of the housing 3 as notches, for example. The openings 80A allow the vents 22 provided to the wall 3m to be exposed on a side opposite the display screen 4a. As a result, according to the modified example, the stand 2 facilitates an air flow to be more efficiently formed inside the housing 3 while the stand 2 has enough stiffness to support the housing 3.

Modified Example 2

Figure 21:
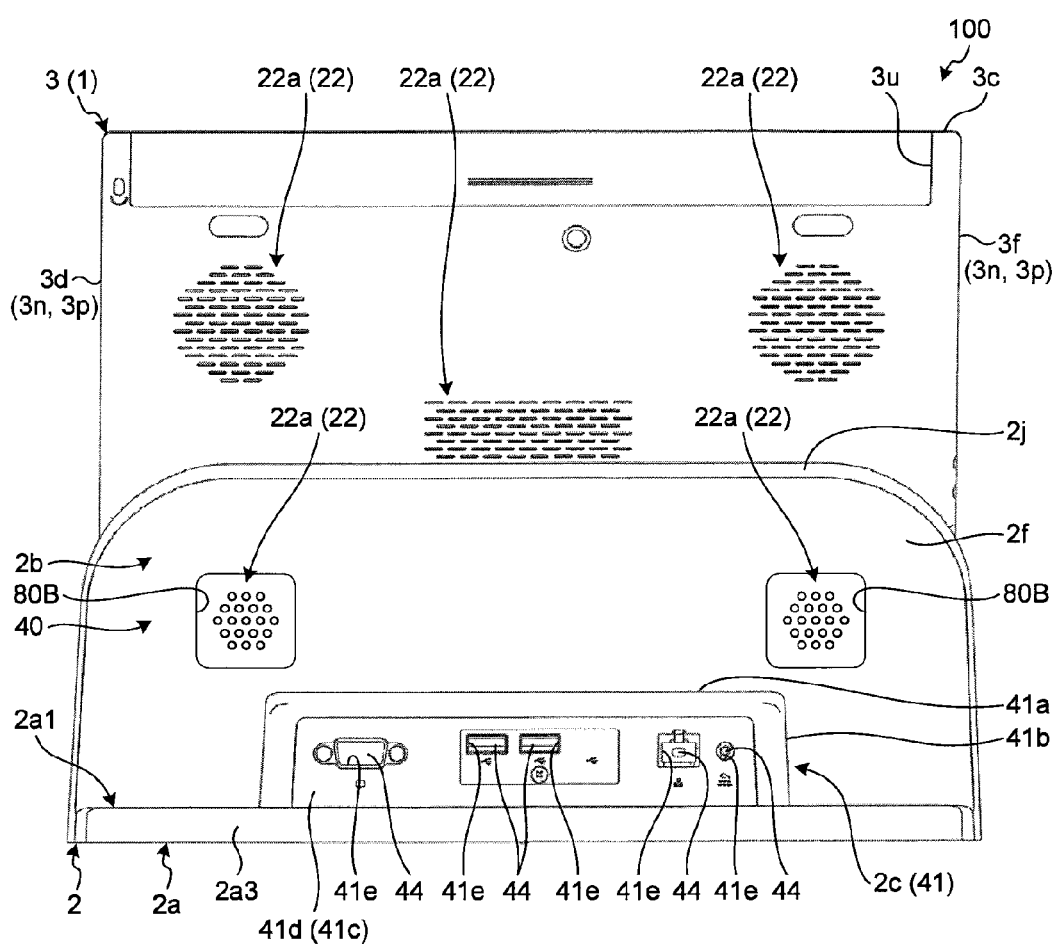
FIG. 21 is an exemplary rear view illustrating a stand according to modified example 2 and the television receiver held by the stand.

In modified example 2, as exemplarily illustrated in FIG. 21, the stand 2 has openings 80B. The modified example is the same as the embodiment except for that the openings 80B are provided. The openings 80B are provided to the wall 2f that covers the back surface 3b of the housing 3 as through holes, for example. The openings 80B allow the vents 22 provided to the wall 3m to be exposed on the side opposite the display screen 4a. As a result, according to the modified example, the stand 2 facilitates an air flow to be more efficiently formed inside the housing 3 while the stand 2 has enough stiffness to support the housing 3.

Modified Example 3

Figure 22:
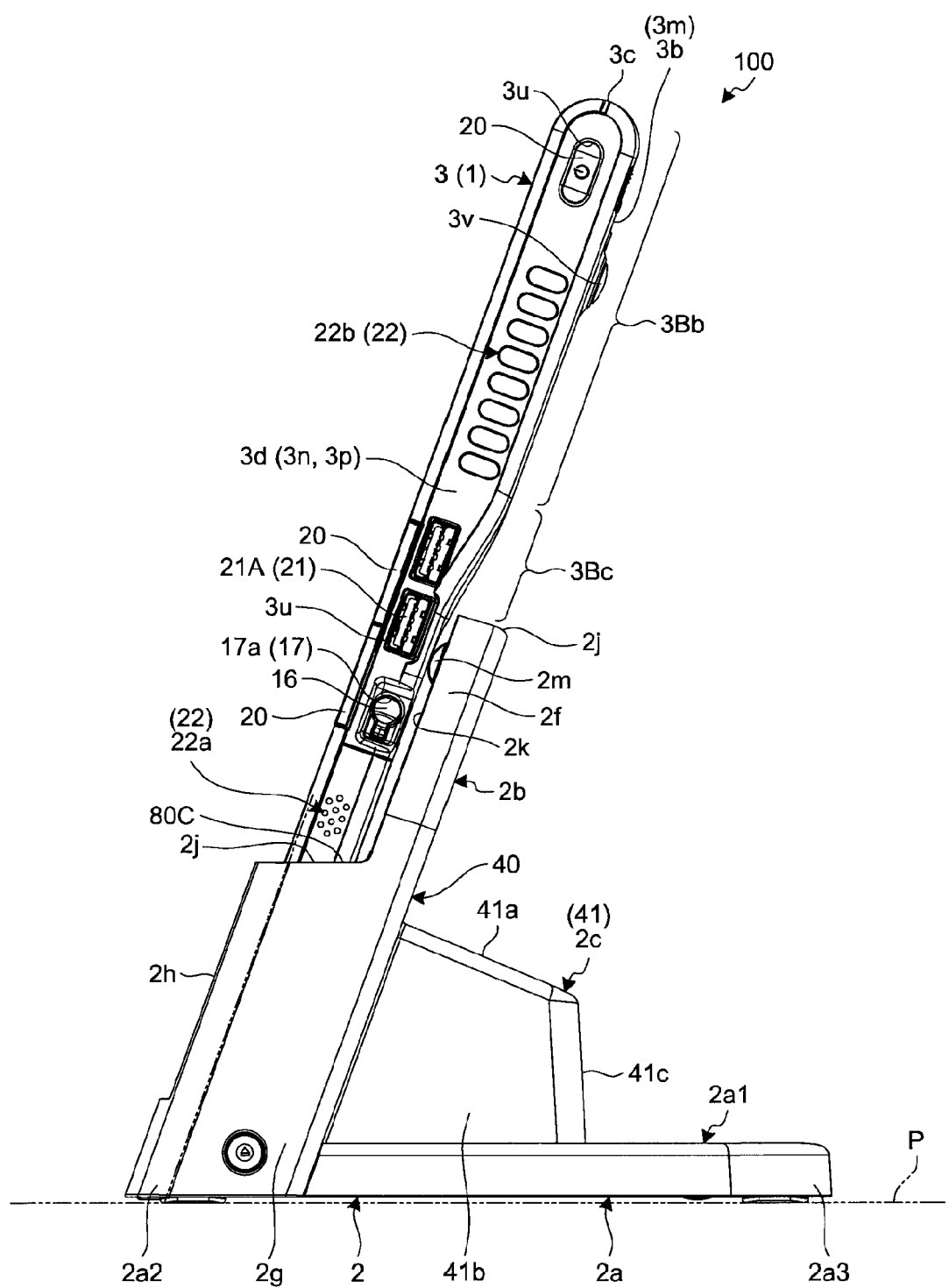
FIG. 22 is an exemplary side view illustrating a stand according to modified example 3 and the television receiver held by the stand.

In modified example 3, as exemplarily illustrated in FIG. 22, the stand 2 has an opening 80C. The modified example is the same as the embodiment except for that the opening 80C is provided. The opening 80C is provided to the edge 2j (border), which is located away from the placement surface P, of the wall 2g that covers the side surface 3p of the housing 3 as a notch, for example. The opening 80C allows the vent 22 provided to the wall 3n (the side surface 3p) to be exposed in a direction along the display screen 4a (the side direction). As a result, according to the modified example, the stand 2 facilitates an air flow to be more efficiently formed inside the housing 3 while the stand 2 has enough stiffness to support the housing 3.

Modified Example 4

Figure 23:
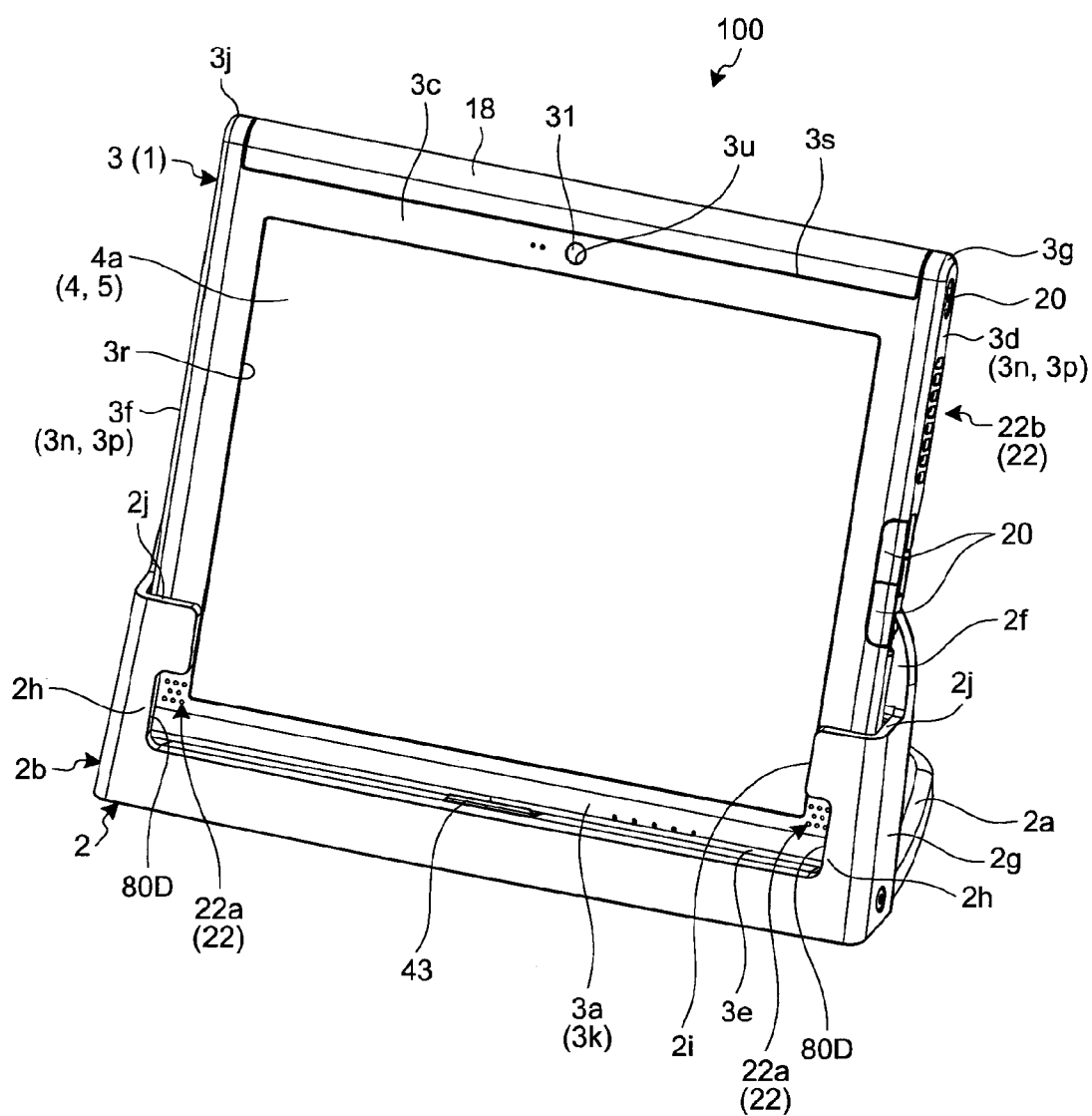
FIG. 23 is an exemplary perspective view illustrating a stand according to modified example 4 and the television receiver held by the stand.

In modified example 4, as exemplarily illustrated in FIG. 23, the stand 2 has openings 80D. The modified example is the same as the embodiment except for that the openings 80D are provided. The openings 80D are provided to the edges of the opening 2i of the walls 2h that cover the front surface 3a of the housing 3, for example. The openings 80D allow the vents 22 provided to the wall 3k (the front surface 3a) to be exposed in front of the display screen 4a. As a result, according to the modified example, the stand 2 facilitates an air flow to be more efficiently formed inside the housing 3 while the stand 2 has enough stiffness to support the housing 3.

Modified Example 5

Figure 24:
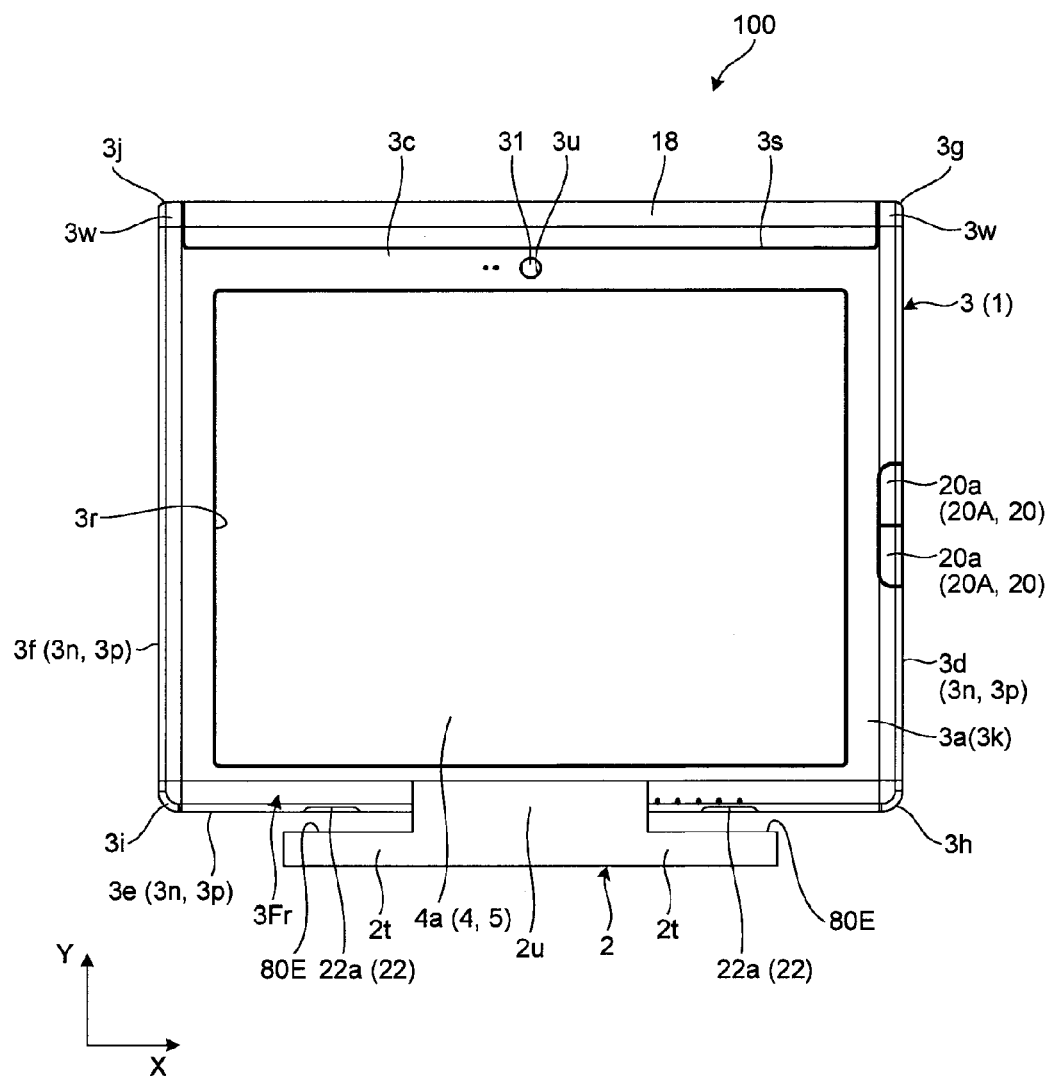
FIG. 24 is an exemplary front view illustrating a stand according to modified example 5 and the television receiver held by the stand.

In modified example 5, as exemplarily illustrated in FIG. 24, the stand 2 has openings 80E. The stand 2 comprises a base 2t (a base portion or a lower portion) and a protrusion 2u (a supporter or an upper portion) protruding from the base 2t, having a width narrower than that of the base 2t when viewed from the front of the stand 2, and supporting the housing 3. The openings 80E are defined by the base 2t and the protrusion 2u. The vents 22 provided to the walls 3n (the side surfaces 3p) face the openings 80E. As a result, according to the modified example, the stand 2 facilitates an air flow to be more efficiently formed inside the housing 3 while the stand 2 has enough stiffness to support the housing 3.

Modified example 6

Figure 25:
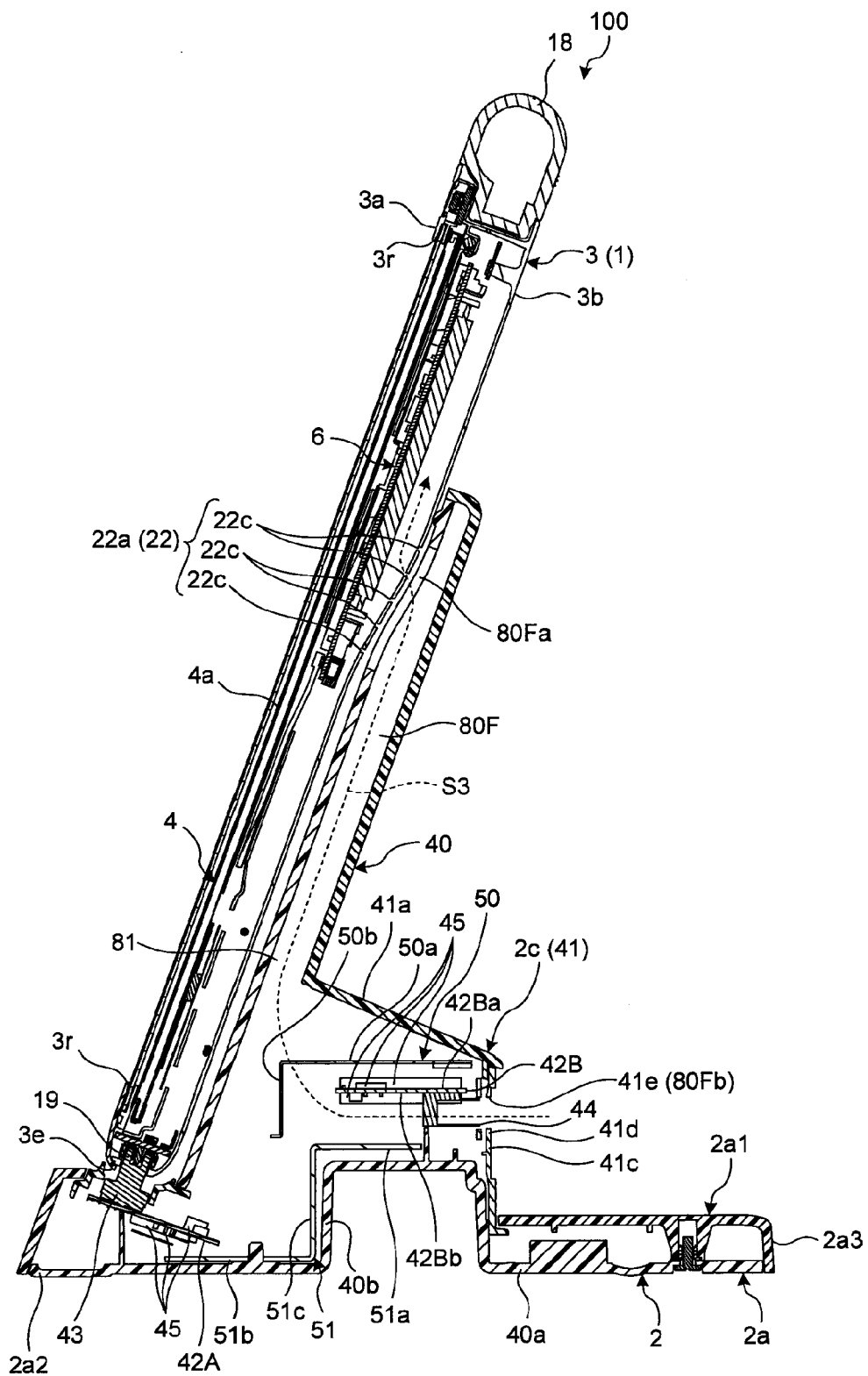
FIG. 25 is an exemplary side sectional view illustrating a stand according to modified example 6 and the television receiver held by the stand.

In modified example 6, as exemplarily illustrated in FIG. 25, an opening 80F is provided inside the housing 40 of the stand 2. The opening 80F extends between an opening 80Fa (a first opening edge) that faces the vent 22 (the intake vent 22a) provided to the wall 3m of the housing 3 and an opening 80Fb (the opening 41e or a second opening edge) that faces a side opposite the side that the opening 80Fa faces. The opening 80Fa can be shaped on the wall 2f as slits or meshes. As a result, according to the modified example, this structure readily increases the stiffness of the stand 2 to support the housing 3 and also facilitates an air flow to be more efficiently formed inside the housing 3. In addition, the present modified example is more effective when applied to a case where heating elements (such as electronic parts and electrical parts) are housed inside the stand 2.

The embodiment and the modified examples that have been described are presented by way of example only. The embodiment and the modified examples are not intended to limit the scope of the invention and various modifications can be made. For example, the stand provided with no connectors can be structured as one of the features of the invention. The stand can charge an electronic apparatus by using a wireless charging method (not illustrated). In such a case, a coil is disposed in (built in or embedded in) the wall (the second portion, the first supporting wall, or the second supporter) of the stand, for example. A coil corresponding to the coil is disposed in (built in) the electronic apparatus. As a result, the connectors may be eliminated. The invention can be applied to an exhaust vent (air exhaust vent) as one of the features of the invention. The invention can be applied to an opening besides the vent. Examples of the opening include an opening for a speaker, an opening for a lamp such as an LED lamp, and an opening for a camera. The technical features of the embodiment and the modified examples can be carried out in any combination of them. The specifications (e.g., the structure, the type, the set direction, the shape, the size, the length, the width, the thickness, the height, the number of portions, the arrangement, the position, or the material) of each element can be arbitrarily changed.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stand configured to support an external electronic apparatus, the external electronic apparatus comprising a display comprising a screen; a circuit board on a side opposite the screen; a housing configured to cover the side opposite the screen and to house the display and the circuit board, the housing comprising a wall comprising a vent; and a first connector a part of which is exposed from the housing, the stand comprising:

a second connector detachably connected with the first connector;

a placement surface portion on which the external electronic apparatus is placed when the first connector is electrically connected to the second connector being disposed on a placement surface; and a supporter configured to support at least a side of the housing of the external electronic apparatus opposite the screen such that a first edge of the housing is close to the placement surface portion and a second edge of the housing is away from the placement surface portion when the external electronic apparatus is placed on the placement surface portion, wherein the supporter is configured to extend from the placement surface portion to an intermediate position between the first edge and the second edge or to a position on a side close to the second edge beyond the intermediate position, the stand is configured to expose the vent of the wall from an edge of the stand close to the second edge at the side close to the second edge when the external electronic apparatus is placed on the placement surface portion, and the supporter is configured to be angled with respect to a vertical direction of the placement surface.

2. The stand of claim 1, wherein the stand is configured to expose a plurality of vents disposed on the wall to be apart from each other in a direction along the second edge from the edge of the stand close to the second edge at the side close to the second edge when the external electronic apparatus is placed on the placement surface portion.

3. The stand of claim 1, wherein the stand is configured to expose a plurality of vents facing each other across the circuit board from the edge of the stand close to the second edge at the side close to the second edge when the external electronic apparatus is placed on the placement surface portion.

4. The stand of claim 1, wherein the housing is configured to house a fan comprising an air intake vent and an air exhaust vent, and the vent is configured to overlap with at least a part of the air intake vent.

5. The stand of claim 1, wherein the vent includes a plurality of vents, and one of the plurality of vents is configured to overlap with at least a part of the circuit board and another of the plurality of vents is configured not to overlap with the circuit board.

6. The stand of claim 1, wherein the stand is configured to cover the vent with a gap between the stand and the vent.

7. The stand of claim 1, further comprising an opening configured to expose the vent.

8. The stand of claim 1, further comprising an opening configured to extend between a first opening edge and a second opening edge, the first opening edge being disposed on a side close to the vent and the second opening edge being disposed on a side opposite the side close to the vent.

9. The stand of claim 1, wherein the wall comprises a portion slanted with respect to the screen, and the vent is disposed on the slanted portion.

10. A stand for a television receiver, the stand being detachably connected to a housing configured to house a display comprising a screen and a circuit board on a side opposite the screen, the housing comprising a wall configured to cover the side opposite the screen, wherein the stand is configured to support the housing such that a first edge of the screen is close to a placement surface and a second edge of the screen is away from the placement surface when the housing is placed on the placement surface, and the stand is configured to extend from the placement surface to an intermediate position between the first edge and the second edge or to a position on a side close to the second edge beyond the intermediate position, the stand is configured to expose a vent of the wall from an edge of the stand close to the second edge at the side close to the second edge when the external electronic apparatus is placed on the placement surface portion, and the stand is configured to be angled with respect to a vertical direction of the placement surface.

\* \* \* \* \*